(12) United States Patent
Uhrenholt et al.

(10) Patent No.: US 11,468,633 B1
(45) Date of Patent: Oct. 11, 2022

(54) METHODS AND SYSTEMS FOR TILE-BASED GRAPHICS PROCESSING

(71) Applicant: Arm Limited, Cambridge (GB)

(72) Inventors: Olof Henrik Uhrenholt, Lomma (SE); Michael Martin Klock, Austin, TX (US); Philip Carlos Garcia, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/218,096

(22) Filed: Mar. 30, 2021

(51) Int. Cl.
*G06T 1/20* (2006.01)
*G06T 17/10* (2006.01)
*G06T 15/00* (2011.01)
*G06T 15/80* (2011.01)

(52) U.S. Cl.
CPC ............ *G06T 17/10* (2013.01); *G06T 1/20* (2013.01); *G06T 15/005* (2013.01); *G06T 15/80* (2013.01)

(58) Field of Classification Search
CPC ......... G06T 1/20; G06T 17/10; G06T 15/005; G06T 15/80
USPC ...................................................... 345/581
See application file for complete search history.

(56) References Cited

U.S. PATENT DOCUMENTS

| | | |
|---|---|---|
| 9,317,948 B2 | 4/2016 | Tapply |
| 9,779,536 B2 | 10/2017 | Engh-Halstvedt |
| 10,255,718 B2 | 4/2019 | Langtind |
| 10,650,577 B2 | 5/2020 | Engh-Halstvedt |
| 10,650,580 B2 | 5/2020 | Engh-Halstvedt |
| 2014/0139534 A1 | 5/2014 | Tapply et al. |
| 2019/0012829 A1 | 1/2019 | Engh-Halstvedt et al. |

FOREIGN PATENT DOCUMENTS

EP 2945126 11/2015

OTHER PUBLICATIONS

International Search Report and Written Opinion dated Jul. 27, 2022, International Application No. PCT/GB2022/050737.

*Primary Examiner* — Jacinta M Crawford
(74) *Attorney, Agent, or Firm* — Vierra Magen Marcus LLP

(57) ABSTRACT

A method of and apparatus for processing graphics in a tile-based graphics processing system, wherein when preparing primitive lists it is determined, based on a measure of the size of a primitive, whether or not to perform processing of one or more attributes of one or more vertices of the primitive.

20 Claims, 7 Drawing Sheets

METHODS AND SYSTEMS FOR TILE-BASED GRAPHICS PROCESSING

BACKGROUND

The technology described herein relates to a method of and apparatus for processing graphics, and in particular to the performing of vertex shading in a tile-based graphics processing system.

Graphics processing is normally carried out by first splitting a scene (e.g. a 3-D model) to be displayed into a number of similar basic components or "primitives", which primitives are then subjected to the desired graphics processing operations. The graphics "primitives" are usually in the form of simple polygons, such as triangles.

The primitives for an output such as a frame to be displayed are usually generated by the application program interface for the graphics processing system, using the graphics drawing instructions (requests) received from the application (e.g. game) that requires the graphics processing.

Each primitive is usually defined by and represented as a set of vertices, where each vertex typically has associated with it a set of "attributes", i.e. a set of data values for the vertex. These attributes will typically include position data and other, non-position data (varyings), e.g. defining colour, light, normal, texture coordinates, etc, for the vertex in question.

For a given output, e.g. frame to be displayed, to be generated by graphics processing, there will typically be a set of vertices defined for the output in question. The primitives to be processed for the output will then be indicated as comprising given vertices in the set of vertices for the graphics processing output being generated. Typically, the overall output, e.g. frame to be generated, will be divided into smaller units of processing, referred to as "draw calls". Each draw call will have a respective set of vertices defined for it and a set of primitives that use those vertices.

Once primitives and their vertices have been generated and defined, they can be processed in order to generate the desired graphics processing output (render output), such as a frame for display. This basically involves rendering the primitives (e.g. performing rasterising, ray tracing, or other suitable rendering processes) to generate the graphics processing output.

The rendering processes use the vertex attributes associated with the vertices of the primitives that are being processed. To facilitate this operation, the attributes of the vertices defined for the given graphics processing output (e.g. draw call) are usually subjected to an initial so-called "vertex shading" operation, before the primitives are rendered. This "vertex shading" operation operates to transform the attributes for each vertex into a desired form for the subsequent graphics processing operations. This may comprise, for example, transforming vertex position attributes from the "model" space that they are initially defined for to the screen space that the output of the graphics processing is to be displayed in.

A graphics processing pipeline being executed by a graphics processor will typically therefore include a vertex shading stage (a vertex shader) that performs vertex shading computations on the initial vertex attribute values defined for the vertices so as to generate a desired set of output vertex attributes (i.e. appropriately "shaded" attributes) for use in subsequent processing stages of the graphics processing pipeline.

Once the vertex attributes have been shaded, the "shaded" attributes are then used when processing the vertices (and the primitives to which they relate) in the remainder of the graphics processing pipeline.

One form of graphics processing pipeline is a so called tile-based graphics processing pipeline, wherein the two-dimensional render output is rendered as a plurality of smaller area sub-regions, usually referred to as "tiles". The tiles are each rendered separately (typically one after another). The rendered tiles are then combined to provide the complete rendering output (e.g. frame for display).

Other terms that are commonly used for "tile-based" rendering include "chunking" (the rendering tiles are referred to as "chunks") and "bucket" rendering. The terms "tile" and "tile-based" rendig will be used hereinafter for convenience, but it should be understood that these terms are intended to encompass all alternative and equivalent terms and techniques.

In a tile-based rendering system, it is accordingly usually desirable to be able to identify and know those primitives that are actually present in a given rendering tile so as to, e.g., avoid unnecessarily rendering primitives that are not actually present in a tile. Accordingly, in tile-based graphics processing, primitives to be processed for a given output (e.g. that make up the draw call currently being processed) are usually sorted into respective primitive lists that indicate for respective regions of the graphics processing output (render output), which primitives are to be processed for the region in question. The regions for which primitive lists are prepared in this regard may for example correspond to individual rendering tiles, or sets of plural rendering tiles. A given primitive may be included in more than one primitive list, e.g. where the primitive falls in more than one region.

The graphics processor and processing pipeline normally includes an appropriate tiler (tiling circuit/stage) that sorts the primitives into the respective primitive lists for this purpose. In effect, each region can be considered to have a bin (the primitive list) into which any primitive that is found to (at least in part) fall within (i.e. intersect) the region is placed (and, indeed, the process of sorting the primitives on a region-by-region basis in this manner is commonly referred to as "binning"). The primitive lists generated by the tiler (tiling circuit) are then used to determine which primitives should be rasterised and rendered when processing a given rendering tile of the graphics processing output.

The Applicants believe that there remains scope for improvements to tile-based graphics processing that employs vertex shading.

BRIEF DESCRIPTION OF THE DRAWINGS

A number of embodiments of the technology described herein will now be described by way of example only and with reference to the accompanying drawings, in which.

Like reference numerals are used for like components where appropriate in the drawings.

DETAILED DESCRIPTION

Figure 1:
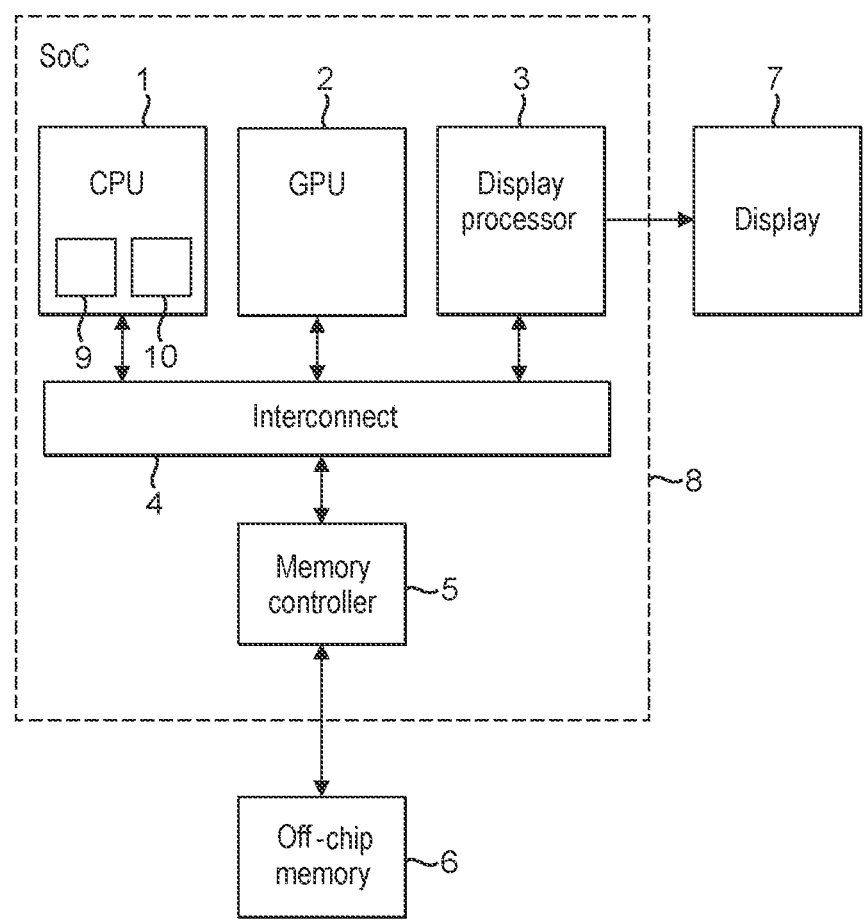
FIG. 1 shows an exemplary data processing system in which the technology described herein may be implemented.

In one embodiment, the technology described herein provides a method operating a graphics processor when generating a render output using tile based rendering, in which a plurality of tiles of a render output being generated are rendered separately, and the rendered tiles combined to form the render output, the method comprising:

preparing one or more primitive lists for the render output, each primitive list listing primitives of a set of primitives to be processed for the render output to be processed for a respective region of the render output, each primitive having associated with it one or more vertices; and for a primitive of the set of primitives to be processed for the render output to be included in a primitive list or lists for the render output:

determining, based on a measure of the size of the primitive, whether to perform processing of one or more attributes of one or more of the vertices of the primitive; and when it is determined based on the measure of the size of the primitive to perform processing of one or more attributes of one or more vertices of the primitive, performing processing of one or more attributes of one or more vertices of the primitive and storing the processed attribute or attributes for the vertices for use in subsequent processing of the primitive, as well as including the primitive in a primitive list or lists for the render output;

when it is determined based on the measure of the size of the primitive to not perform processing of one or more attributes for one or more vertices of the primitive, including the primitive in a primitive list or lists for the render output without also performing processing of one or more attributes for the vertices of the primitive in response to the primitive size determination.

In another embodiment, the technology described herein provides a graphics processor configured to generate a render output using tile based rendering, in which a plurality of tiles of a render output being generated are rendered separately, and the rendered tiles are combined to form the render output, the graphics processor comprising:

a primitive list preparation circuit configured to prepare one or more primitive lists for a render output, each primitive list listing primitives of a set of primitives to be processed for the render output to be processed for a respective region of the render output, each primitive having associated with it one or more vertices;

wherein the primitive list preparation circuit comprises a determination circuit configured to, for a primitive of a set of primitives to be processed for a render output to be included in a primitive list or lists for the render output, determine based on a measure of the size of the primitive whether to perform processing of one or more attributes of one or more of the vertices of the primitive;

wherein the primitive list preparation circuit is configured to:

when it is determined based on the measure of the size of a primitive to perform processing of one or more attributes of one or more vertices of the primitive, trigger processing of one or more attributes of one or more vertices of the primitive and storing of the processed attribute or attributes for the vertices for use in subsequent processing of the primitive, and include the primitive in a primitive list or lists for the render output;

when it is determined based on the measure of the size of a primitive to not perform processing of one or more attributes for one or more vertices of the primitive, include the primitive in a primitive list or lists for the render output without also triggering processing of one or more attributes for the vertices of the primitive in response to the primitive size determination.

The technology described herein relates to tile-based graphics processing in which primitive lists are prepared in order to identify primitives which are to be processed for regions of a render output. However, in the technology described herein, as well as preparing the primitive lists, it is also determined whether to perform additional vertex attribute processing (shading) for vertices of the primitive, or whether to simply include the primitive in a primitive list without performing further vertex attribute shading.

The Applicants have recognised in this regard that depending on the size of a primitive, it may or may not be beneficial to perform (vertex) attribute shading when preparing primitive lists.

For example, the Applicants have recognised that if attributes for the vertices of a primitive are processed (shaded) at this point (when preparing primitive lists) and the processed (shaded) attributes are stored, that attribute processing (shading) may only need to be performed once, since the stored processed attribute data can be available for use in later processing stages. Hence, performing attribute shading upfront in this manner may have a relatively lower arithmetic processing cost, since it allows such attribute shading to (potentially) be performed only once. On the other hand, reading the attributes from memory, shading the attributes, and writing the shaded attributes to memory for use during subsequent processing may increase the amount of memory bandwidth that is consumed (and thus the electrical energy expended as a result of utilising the memory bandwidth, which can amount to a significant amount of energy).

Conversely, the Applicants have recognised that not performing processing (shading) of one or more attributes for the vertices of the primitive upfront in this way, should reduce the memory bandwidth consumed (since attributes are not read from memory, shaded, and then written back to memory as shaded attributes for use during subsequent processing). However, this approach may carry a higher arithmetic processing cost, as processing (shading) of the attributes may need to be performed during later processing (e.g. when the tiles of the render output are being processed using the primitive lists), and in particular processing of vertex attributes for a primitive may need to be repeated for each tile in which a primitive falls.

The Applicants have recognised that a suitable balance between these alternatives (in order to balance arithmetic processing costs and bandwidth costs) when performing tile-based graphics processing may be achieved by selecting the alternative to use, for a given primitive, based on a measure of the size of the primitive.

In particular, the Applicants have recognised that a relatively larger primitive is likely to span multiple tiles and so the arithmetic processing cost of performing attribute shading per tile for such as primitive is likely to be relatively higher. As such, the Applicants have recognised that it may be preferable to perform attribute shading when preparing the primitive lists so that attribute shading should only be performed once, thus reducing the overall arithmetic processing cost. This reduction in arithmetic processing cost may outweigh the relatively larger memory bandwidth cost associated with reading attributes from memory, shading the attributes and then storing shaded attributes in memory for subsequent use.

Conversely, the Applicants have recognised that a relatively smaller primitive is likely to appear in only one or relatively few tiles, and so the arithmetic processing cost of performing attribute shading per tile for such a primitive may be relatively lower (and may be less onerous than a memory bandwidth cost associated with reading attributes from memory, shading the attributes, and then storing shaded attributes to memory in advance when preparing primitive lists). As such, it may be preferable to perform vertex attribute shading at a later stage (e.g. during per-tile processing), with the vertex attribute shading being performed as and when needed.

As noted above, the technology described herein relates to tile-based graphics processing, in which the render output (such as, e.g., a frame to be displayed) is divided into plural rendering tiles for rendering purposes (is processed on a tile-by-tile basis). Each rendering tile should, and in an embodiment does, span a (respective) sub-region (area) of the render output. The tiles that the render output is divided into for rendering purposes in the technology described herein can be any suitable and desired such tiles. The size and shape of the rendering tiles may be dictated by the tile configuration that the graphics processor is configured to use and handle.

The rendering tiles are in an embodiment all the same size and shape (i.e. regularly-sized and shaped tiles are in an embodiment used), although this is not essential. The tiles are in an embodiment rectangular, and in an embodiment square. The size and number of tiles can be selected as desired. Each tile may correspond to an array of contiguous sampling positions, for example each tile being 16×16 or 32×32 or 64×64 sampling positions in size (wherein each sampling position may correspond to a pixel for the render output). The render output may be divided into however many such tiles are required to span the render output, for the size and shape of the render output that is being used.

In the technology described herein, one or more, and in an embodiment plural, primitive lists are prepared, each primitive list identifying (listing) one or more primitives which are to be processed for a respective region (area) of the render output in question.

The regions for which primitive lists are prepared in an embodiment encompass (or correspond to) one or more rendering tiles of the render output. In an embodiment a region for which a primitive list is prepared corresponds to one or more contiguous tiles (and thus spans an array of contiguous sampling positions). The region for which a primitive list is prepared is in an embodiment rectangular (and more in an embodiment square).

In an embodiment, there are one or more sets of regions for which primitive lists can be prepared, with the regions in different sets of regions in an embodiment differing in size (area).

In an embodiment, the sets of regions are arranged in a hierarchy of sets of regions, wherein each set of regions corresponds to a layer in the hierarchy of sets of regions, and wherein regions in progressively higher layers of the hierarchy are progressively larger. Each set of regions (corresponding to a layer in the hierarchy) in an embodiment spans the (entire) render output, such that the render output is effectively overlaid by plural layers of sets of regions (and accordingly wherein regions in different layers in the hierarchy may overlap one another).

In an embodiment, each region for which a primitive list can be prepared in a lowest layer of the hierarchy corresponds to a single tile of the render output, with regions in successively higher layers encompassing progressively more tiles, e.g. corresponding to 2×2 tiles, 4×4 tiles, 8×8 tiles, etc. respectively (or any other suitable and desired increasing region size). Thus, the sets of regions in an embodiment comprise one set of regions in which each region of the set corresponds to a respective single rendering tile, and one or more (and in an embodiment more than one) sets of regions in which each region of the set corresponds to (encompasses) more than one rendering tile.

In an embodiment regions in the same set of regions (same layer of the hierarchy) are the same size and shape (for example, each encompassing the same number of tiles). In an embodiment regions in the same set of regions (same layer of the hierarchy) correspond to different regions of the render output (such that regions in the same set of regions do not overlap).

It will be apparent that, in such arrangements, regions in different sets of regions (different layers of the hierarchy) may encompass the same portion of a render output (albeit at a different resolution), such that a primitive may fall within one or more regions in different layers of the hierarchy (and correspondingly have one or more primitive lists into which it could be binned). (Likewise, primitive lists for multiple different regions in different layers of the hierarchy may need to be consulted in order to identify primitives needed to render a tile).

The set of primitives which are to be processed for the render output (and for which primitive lists are to be prepared) may comprise a set of primitives for generating the entire (complete) render output, or more in an embodiment are a set of primitives for generating part of the render output (e.g. corresponding to a draw call).

In order to prepare the primitive lists, the primitives of the set of primitives may first be assembled, and then the positions of the assembled primitives may be used to determine which region(s) of the render output the primitive falls within (and thus which primitive list(s) to include the primitive in).

Assembling the set of primitives may be performed by a suitable primitive assembly circuit. Assembling the set of primitives may be performed in any suitable and desired manner. For example, primitive assembly may comprise receiving information (e.g. indices) identifying vertices of a set of vertices to be used to form the primitives of the set of primitives, and then assembling primitives (determining the vertices corresponding to each primitive of the set of primitives) using the information (e.g. indices) identifying the vertices. The primitive assembly may be performed in accordance with information (primitive configuration information) indicating how the primitives are to be assembled, e.g. indicating whether primitives in the form of simple triangles, triangle strips, or triangle fans, etc., should be generated from the set of vertices.

To prepare the primitive lists, the (assembled) primitives are sorted (binned) into one or more primitive lists based on the region(s) of the render output which the primitives fall within.

Which region(s) a primitive falls within (and accordingly which primitive lists a primitive could be included in) will be, and is in an embodiment, determined based on the position of the primitive in the render output. The position of the primitive in the render output may be, and is in an embodiment, determined based on the positions of the vertices of the primitive.

The positions of the vertices of the primitives that are used for the primitive listing process should, and in an embodiment do, comprise the positions of the vertices in the "screen space" of the render output.

Thus, in an embodiment, appropriate position shading for the vertices of the primitives is performed to transform (shade) the positions (position attributes) of the vertices as appropriate for the render output. The so transformed (shaded) positions are in an embodiment then used for preparing the primitive lists.

The position shading may be performed, e.g. before or after primitive assembly.

Hence, in embodiments, prior to sorting primitives of the set of primitives to be processed for the render output into primitive lists, processing of one or more position attributes (position shading) is performed for vertices of a set of vertices to be used to form the set of primitives. Correspondingly, when preparing primitive lists, the region(s) which a primitive falls within (and accordingly which primitive lists the primitive could be listed in) is determined based on shaded positions of the vertices of the primitive.

The determination of which region(s) a primitive falls within may use any suitable and desired technique, such as exact binning, or bounding box binning, or a combination of these techniques. In an embodiment bounding box binning is used when preparing primitive lists.

As noted above, in embodiments, primitive lists may be generated for regions of the render output which comprise plural sets of regions arranged as a hierarchy of sets of regions (such that the render output is effectively overlaid by plural layers of sets of regions). In this case, a given primitive could, for example, be equally listed in primitive lists at different layers (levels) of the hierarchy. In an embodiment therefore, it is determined which layer of the hierarchy to list a primitive at.

In this case, when determining which primitive lists (at which level of the hierarchy) to include a primitive in, there may be a balance to be struck between the number of lists a primitive is written in to, and the size of the regions of the render output it is listed for (as this will determine the number of times the primitive will need to be read, potentially unnecessarily during subsequent per-tile processing, e.g. such as rendering and rasterising). For example, if a primitive is listed at a lower level of the hierarchy (for smaller render output regions), it will have to be written into a larger number of primitive lists, but if it is written at a higher level of the hierarchy (for larger render output regions), it will potentially be re-read and processed more times as the list for the region will be reused for each rendering tile the region covers during subsequent per-tile processing. In embodiments, a cost function that considers read, processing and write costs may be used to determine at which level of the hierarchy a primitive should be listed, e.g. to try to optimise this balance.

Hence, in embodiments, a cost function is used to determine a particular layer of the hierarchy of sets of regions at which a primitive should be listed. The cost function may account for (be based on) a cost of reading a primitive from a primitive list and/or writing a primitive to a primitive list for one or more different layers of the hierarchy, and/or the cost of processing a primitive for a tile.

Including (listing) a primitive in a primitive list (bin) may, and in an embodiment does, comprise listing appropriate data for the primitive in the primitive list, such as an identifier (e.g. an index) for the primitive, together with an indication of the vertices of the primitive (e.g. such as an index identifying each vertex of the primitive).

The primitive lists which are prepared may be stored in a suitable storage (e.g. memory, e.g. a local memory or in an embodiment a main memory of the graphics processing system which the graphics processor is part of), for use during later processing (e.g. such as rendering, e.g. including one or more of rasterising, ray tracing, and any other suitable rendering processing).

There may be some (assembled) primitives of the set of primitives for the render output which are not listed in any primitive list, e.g. if those primitives fall outside the view frustrum or are otherwise culled (e.g. based on a depth or backward-facing culling test).

In the technology described herein, for any primitive which is to be included in a primitive list it is determined, based on a measure of the size of the primitive, whether (or not) to perform processing of one or more attributes of the vertices of the primitive (this will be, and is in an embodiment, in addition to any processing of position attributes of the vertices that may have already been performed, as discussed above).

In this regard, the Applicants have recognised that for relatively larger primitives, it may be beneficial to perform processing (shading) of one or more attributes when generating the primitive lists, since the memory bandwidth cost of writing the processed attributes to (and subsequently reading the processed attributes) from memory may be less onerous than the potential arithmetic processing cost of performing the attribute shading for each tile spanned by the primitive during later per-tile processing (e.g. such as rendering).

Conversely, for relatively smaller primitives, it may be beneficial not to perform processing (shading) of one or more attributes when generating the primitive lists, since the memory bandwidth savings associated with not having to write the processed attributes to memory (and read the processed attributes from memory when performing subsequent processing) may outweigh any potential arithmetic processing costs associated with performing the processing (shading) of those attributes for each tile spanned by the primitive during subsequent per-tile processing (e.g. such as rendering).

Hence, in an embodiment, when the measure of the size indicates that the primitive is relatively larger, then it is determined to perform processing of one or more attributes of one or more of the vertices of the primitive. In an embodiment, when the measure of the size of a primitive indicates that the primitive is relatively smaller, then it is determined not to perform processing of the one or more attributes of one or more of the vertices of the primitive.

Hence, in an embodiment, if the measure of size of a primitive is larger than a threshold, then it is determined to perform processing of one or more attributes of one or more of the vertices of the primitive. If the measure of the size of a primitive is smaller than a threshold, then it is determined not to perform processing of the one or more attributes of the one or more of the vertices of the primitive.

The measure of size of the primitive used in the technology described herein may be any desired and appropriate measure of a primitive's size.

For example, the measure of the size of a primitive could be an (exact) size of the primitive itself or of a bounding box for the primitive, for example evaluated in terms of a number of sampling positions (e.g. pixels) that the primitive or bounding box will encompass in the render output.

However, in an embodiment, the measure of the size of a primitive which is used in the technology described herein is a measure of (or corresponds to) a number of tiles which the primitive spans (falls within).

In this regard, as mentioned above, the Applicants have recognised that for tile-based rendering, the number of tiles that a primitive spans may influence whether memory bandwidth cost associated with storing one or more processed (shaded) attributes of the vertices of a primitive generated when preparing the primitive lists is less than potential arithmetic processing costs of performing processing (shading) for those attributes at a later stage on a per-tile basis.

Hence, in an embodiment, when the measure of the size indicates that the primitive spans a relatively larger number of tiles (e.g. is more than a threshold number of tiles), then it is determined to perform the processing of the one or more attributes of one or more of the vertices of the primitive. In an embodiment, when the measure of the size of a primitive indicates that the primitive spans a relatively smaller number of tiles (e.g. is less than a threshold number of tiles), then it is determined not to perform the processing of the one or more attributes of one or more of the vertices of the primitive.

A measure of size which is indicative of the number of tiles spanned by a primitive could be calculated in any desired way, e.g. by calculating an exact number of tiles spanned by the primitive (or a bounding box for the primitive). However, the measure of size is in an embodiment determined based on the primitive list or lists in which a primitive has been (or is to be) included (listed). In this regard, the Applicants have recognised that the primitive list(s) in which a primitive is listed is generally indicative of the region(s) and thus the number of tiles spanned by the primitive.

As noted above, the regions for which primitive lists can be generated may differ in size (e.g. there may be a hierarchy of sets of regions describing the render output, for which primitive lists can be generated, wherein regions in progressively higher layers in the hierarchy are progressively larger). Hence, the size of a primitive may relate not only to the number of primitive lists in which the primitive is to be included, but also the size of the region which each primitive list corresponds to (or which layer of a hierarchy of sets of regions each primitive list corresponds to).

Hence, in embodiments, the measure of size of a primitive is determined based on the primitive lists in which a primitive has been (or is to be) included, and more in an embodiment based on the number of primitive lists and/or the size of the regions for the primitive list(s) (or the layers of a hierarchy of sets of regions the primitive list(s) correspond to) in which a primitive has been (or is to be) included.

At least in embodiments where primitive lists each correspond to a region of the same size (such that there is no hierarchy of sets of regions), then the measure of size of a primitive could simply be the number of primitive lists in which a primitive is listed (and in one embodiment, that is the case).

In embodiments where primitive lists may correspond to regions which differ in size (e.g. forming a hierarchy of sets of regions), the measure of size of a primitive is in an embodiment based on the size of the regions for the primitive lists in which the primitive is listed. For example, at least in the case where each primitive can be listed only at a single layer (level) of the hierarchy, the measure of size of a primitive could be the layer (level) of the hierarchy at which the primitive is listed (or the size of the regions of the primitive lists in which the primitive is listed). Alternatively, where a primitive can be listed at one or more different layers (levels) of the hierarchy), the measure of size of a primitive could be the highest layer (level) of the hierarchy at which the primitive is listed (or the largest size of the regions for the primitive lists in which the primitive is listed).

In one embodiment, where primitive lists may correspond to regions which differ in size (e.g. forming a hierarchy of sets of regions), the measure of size of a primitive is based only on a size of the region for the primitive list(s) in which the primitive is listed.

In another embodiment, the measure of size of a primitive is based on both the number of primitive lists a primitive is included in, and the size of the regions (the layer in the hierarchy) for (some or all of) those primitive lists.

For example, the measure of a size of a primitive could be determined based on a weighted sum of the number primitive lists a primitive is included in, wherein the number of primitive lists for each size of region (layer in the hierarchy) is weighted based on the region size (layer in the hierarchy), wherein larger regions (higher layers of the hierarchy) have a larger weighting and thus result in a larger measure of size.

As noted above, in embodiments, the determination, based on the measure of size of a primitive, of whether (or not) to perform processing of one or more attributes for the vertices of the primitive comprises considering (and in an embodiment comparing) the measure of size of a primitive against a threshold measure of size.

For example, the measure of size of a primitive could be a value (e.g. calculated based on the number of primitive lists which the primitive is to be included in and/or the size of the regions for those primitive lists) which is compared against a threshold value for the measure of size when performing the determination based on the measure of size of a primitive (such that the measure of size is compared directly against a threshold value for the measure of size). Alternatively, a mapping could be used, which indicates for a measure of size of a primitive (e.g. for a number of primitive lists which the primitive is to be included in and/or the size of the regions for those primitive lists) whether the measure of size is above or below a threshold measure of size (the mapping thereby providing a proxy for direct comparison against a threshold value).

In embodiments, the measure of size of a primitive and the determination based on the measure of size are configured such that a primitive will trigger (will have a sufficiently small size to trigger) a determination not to perform processing of one or more attributes for the vertices of the primitive when the primitive is listed only in primitive lists for regions having a region size no greater than a threshold size (no higher than a threshold layer of a hierarchy of sets of regions), in an embodiment such that it is determined not to perform processing of one or more attributes for the vertices of the primitive when the primitive is listed only in primitive lists for a smallest region size (lowest layer of a hierarchy of sets of regions).

More in an embodiment, the measure of size of a primitive and the determination based on the measure of size are configured such that it is determined not to perform processing of one or more attributes for the vertices of the primitive when the primitive is listed only in primitive lists for regions having a region size no greater than a threshold size (threshold layer of a hierarchy of sets of regions) and is listed in no more than a threshold number of primitive lists for a (or each respective) region size (layer of the hierarchy of sets of regions). The threshold number of primitive lists for different region sizes (layers of the hierarchy of sets of regions) may differ, such that larger regions sizes (higher layers in the hierarchy) have a (progressively) smaller threshold number of primitive lists. For example, a determination not to perform processing of one or more attributes for the vertices of a primitive may be triggered when a primitive is only listed in four or fewer primitive lists for a smallest region size (lowest layer of hierarchy of sets of regions).

In embodiments, the measure of size of a primitive and the determination based on the measure of size are (also or instead, and in an embodiment also) configured such that a primitive will trigger (will have a sufficiently large size to trigger) processing of one or more attributes for the primitive when the primitive is listed in one or more (or any) primitive lists for a region which is larger than a threshold region size (at a level higher than a threshold layer of a hierarchy of sets of regions), in an embodiment when the primitive is listed in one or more (or any) primitive lists for a region which is larger than a smallest region size (at a level higher than a lowest layer of a hierarchy of sets of regions).

In these cases, in an embodiment, the smallest region size corresponds to a single tile.

Accordingly, the threshold measure of size may be configured (set) as appropriate, such that the determination based on the measure of size causes processing of one or more attributes of the vertices of a primitive to be performed for primitives of a relatively smaller size (and does not cause processing of one or more attributes of the vertices of a primitive for primitives of a relatively larger size), e.g. so as to balance memory bandwidth and arithmetic processing costs as discussed above.

In embodiments, the threshold measure of size is configured (set) according to a cost calculation (analysis). The cost calculation may account for any suitable costs associated with performing (or not performing) processing of one or more attributes of a primitive when preparing primitive lists, and in an embodiment provides a balance between memory bandwidth costs associated with writing processed attribute data to memory (and reading the processed attribute data from memory for later processing) and potential arithmetic processing costs associated with performing processing of one or more attributes of a primitive on a per-tile basis during later processing. Hence, in embodiments, the cost calculation (assessment) accounts for at least one of: a cost of writing to memory one or more processed (shaded) attributes of a primitive, a cost of reading from memory one or more processed (shaded) attributes of a primitive, and a cost of performing processing of one or more attributes of a primitive. The attributes considered in an embodiment comprise at least one or more non-position attributes for vertices of a primitive, and in an embodiment also one or more (or all) position attributes for the vertices of the primitive.

In embodiments, the threshold measure of size takes into account the size of the tiles that are being generated (the effective tile size). The Applicants have recognised in this regard that depending on the, e.g. per sampling position storage requirements (which may depend, for example, on the data format being used for each sampling point), the available local (on-chip) storage used for the tile buffer may only be able to store (or it may be desirable only to store) tiles of a particular size, and that the tile size able to be, and being, used may vary, depending, e.g. upon the sampling position data format being used, such that the graphics processor may be configured to generate tiles having different effective sizes at different times (and for different render outputs). In this case, the threshold measure of size in an embodiment takes account of the (effective) tile size that is currently being used (and correspondingly the thresholds discussed herein in terms of a number of tiles that are primitive may be listed for is in an embodiment in terms of the tile size that is being used for the render output in question).

The threshold measure of size could be fixed (pre-set), e.g. to balance memory bandwidth and arithmetic processing costs based on typical memory bandwidth and arithmetic costs.

Alternatively, the threshold measure of size could be set (updated) in use. For example, the threshold measure of size could be set (updated) for a (particular) render output which is to be generated (e.g. in response to a request to perform performing processing for a render output, e.g. frame), or for set of primitives to be processed for the render output, or for a subset of those primitives.

The threshold measure of size could be set (updated), for example, based on expected memory bandwidth and arithmetic processing costs for processing the render output, set of primitives, or subset of primitives.

Alternatively or additionally, the threshold measure of size could be set (updated) based on performance measures from graphics processing performed for one or more previous render outputs, or for the current render output. The performance measures may indicate, for example, memory bandwidth costs and arithmetic processing costs incurred during graphics processing. The threshold measure of size could be set (or updated) based on a comparison of the performance measures against expected values for those performance measures.

Alternatively (or additionally), the threshold measure of size could be updated based on current or desired workloads of the graphics processor, to increase (or reduce) the number of primitives for which it is determined to perform processing of one or more attributes of the vertices of the primitive when assembling the primitive lists (and thus change the balance of bandwidth costs and arithmetic processing costs incurred). For example, it may be desirable to, e.g., reduce memory bandwidth consumed by writing attributes to (and reading attributes from) memory at the expense of increased potential arithmetic processing costs, in order to free-up memory bandwidth for other processing which is to be performed by the graphics processing unit.

The threshold measure of size could be updated in any suitable and desired manner, e.g. by altering the relative costs in the cost calculation to give a new threshold measure of size.

Alternatively, instead of setting and updating the threshold measure of size (e.g. based on a cost calculation), the manner in which the measure of size itself is calculated could be set and updated, e.g. to change the weightings of different regions sizes.

Whilst the determination of whether or not to perform shading of one or more attributes of the vertices of a primitive based on a measure of the size of the primitive could be performed for all primitives which are to be processed to provide a render output, the Applicants have recognised that there may be situations where it is better not to do this.

Hence, in an embodiment, the determination based on the measure of the size of a primitive is selectively enabled or disabled based on one or more criteria. This selective enablement/disablement could be performed in any suitable manner, e.g. by ignoring (overriding) the results of the determination, or by not performing the determination at all.

In an embodiment, an indication is provided to indicate when the determination based on the measure of size of the primitive is to be disabled. The indication may be any suitable and desired indication which may be used by the graphics processor when preparing primitive lists (and optionally when performing subsequent processing).

The indication that the determination based on the measure of the size of the primitive is to be disabled can be provided in any suitable and desired manner. It is in an embodiment provided by the driver for the graphics processor. (The driver can determine whether for the processing required for the render output in question, it is appropriate to disable the determination based on the measure of the size of the primitive, and if so, the driver will then provide an appropriate indication of that to the graphics processor.)

It could be the case in this regard that there is no need to perform any determination based on the size of the primitive to determine how to process the primitives because, for example, the attributes for the primitives have already been processed (shaded) before the tiling process (the primitive listing process) starts. This could be the case, for example, where tessellation is being performed. In this case, since the processed (transformed) attributes may, for example, already have been determined and stored in the memory, there is no need to determine whether or not to do that based on the measure of the size of the primitive when the primitive lists are being prepared. (Correspondingly, in this case, all the primitives will in an embodiment be flagged as having had their attributes processed (the transformed vertex attributes generated) for the purposes of subsequent processing using the attributes.)

On the other hand, it could be the case that there has not yet been any processing of the attributes before the primitive listing (tiling process), but it is still desired to disable the determination of whether to perform the attribute processing or not based on the measure of size of a primitive, e.g. because it would be preferable to process all primitives in a particular manner irrespective of their size.

When the determination based on the measure of the size of a primitive is disabled then where necessary a particular, in an embodiment selected, in an embodiment predefined default processing is in an embodiment performed. The default processing may comprise not performing processing of one or more attributes of the vertices of a primitive when preparing the primitive lists. Alternatively, and in an embodiment, the default processing comprises performing processing of one or more attributes of the vertices of a primitive when preparing the primitive lists.

In this regard, the Applicants have recognised that there may be circumstances where it is desirable to always perform processing for one or more attributes of the vertices of primitives when preparing primitive lists, irrespective of the sizes of the primitives, and/or, for example, where processing for one or more attributes of the vertices of primitives will have already been performed prior to preparing the primitive lists. These may include, for example, situations where subsequent per-tile processing which is to be performed using the primitive lists is particularly complex and carries a particularly high arithmetic cost (e.g. when a render output is to be generated using tessellation, and for geometry shader render passes), or situations where regions smaller than a tile may be processed so that insufficient memory bandwidth and processing savings would be achieved through deferring processing of vertex attributes (e.g. when the render output is to be generated using Multi-view rendering, Future task rendering, Mesh shaders, Multisample Anti-Aliasing (MSAA), or Multiple Render Targets (MRT)). In either of these cases, it would not be necessary, nor desirable, to perform the determination based on the measure of the size of the primitive to determine how to process the primitives.

Hence, in an embodiment, the determination based on the measure of size of the primitive is disabled when one or more (pre-determined) criteria are met, in an embodiment when generating the render output requires/uses one or more of the following: tessellation, one or more geometry shader render passes, Multi-view rendering, Future task rendering, Mesh shaders, Multisample Anti-Aliasing (MSAA), and Multiple Render Targets (MRT).

When the determination based on a measure of the size of a primitive is performed, and when it is determined to perform processing of one or more attributes for the vertices of a primitive, the one or more attributes which are processed (shaded) are in an embodiment one or more non-position attributes for the vertices of the primitive (i.e. one or more attributes which are not position attributes). The one or more non-position attributes may comprise one or more of: colour, light, normal, texture coordinates, etc. for the vertex in question. The processed (shaded) one or more non-position attributes are then accordingly stored (e.g. in memory) for use in subsequent processing of the primitive.

Where one or more position attributes for the vertices of a primitive have already been processed (shaded) prior to the determination based on a measure of the size of a primitive (e.g. prior to primitive list preparation, as discussed above) then, in an embodiment, when it is determined based on the measure of the size of a primitive to perform processing of one or more (non-position) attributes of the vertices of the primitive, such that those one or more (non-position) attributes are stored for use in subsequent processing of the primitive, the one or more (and in an embodiment all of the) processed position attributes for the vertices of the primitive are also stored for use in subsequent processing of the primitive.

Conversely, in an embodiment, when it is determined based on the measure of the size of a primitive not to perform processing of one or more (non-position) attributes, the one or more (and in an embodiment all of the) processed position attributes for the vertices of the primitive are discarded (not stored for use in subsequent processing of the primitive) (once they have been used for preparing the primitive list(s)). (Correspondingly, the position attributes for the vertices of a primitive will need to be and are in an embodiment processed (the shaded position attributes will need to be re-generated) during subsequent processing of the primitive).

The Applicants have recognised that in such cases (e.g. corresponding to for relatively smaller primitives), a memory bandwidth saving associated with discarding the position attributes for a primitive may outweigh a potential arithmetic cost associated with processing (shading) position attributes for the primitive during subsequent processing on a per-tile basis.

It would also be possible to handle any state associated with and generated for the primitives in a similar manner, if desired, for example, and in an embodiment, to, when it is determined based on the measure of the size of a primitive not to perform processing of one or more (non-position) attributes of vertices of the primitive, discard some or all of the state for the primitive (not store some or all of the state for the primitive for use in subsequent processing of the primitive), and correspondingly then re-generate the state as required during subsequent processing of the primitive.

In an embodiment, as well as determining based on a measure of size of a primitive whether or not to perform processing for one or more attributes for the vertices of the primitive, an indication is also provided (e.g. as metadata) (and stored) which indicates the outcome of the determination (indicating whether processing for one or more attributes for the vertices of the primitive has been performed or not). This will then allow subsequent processing (e.g. rendering) to more quickly be able identify whether processing (shading) of one or more attributes has been performed and processed attributes have already been stored when preparing the primitive lists (or not).

Such an indication is in an embodiment also provided appropriately in the case where the determining based on a measure of size of a primitive whether or not to perform processing for one or more attributes for the vertices of the primitive was not performed (was disabled), i.e. to correspondingly indicate how the primitive should be treated for subsequent processing in that event. For example, in the case where the determination based on the measure of the size of the primitive is disabled (not used) because the processed attributes have already been generated and stored in memory prior to preparing the primitive lists, then an appropriate indication is in an embodiment associated with (provided for) each primitive that that applies to, to indicate, in effect, that the processing for the attributes has been performed (i.e. that the processed attributes are already stored in memory).

In embodiments, a (separate) indication is provided for each primitive. Alternatively, an indication could be provided (only) whenever the outcome of the determination based on the measure of size of a primitive changes.

The indication may be any suitable and desired indication. In an embodiment, the indication is associated with the primitive, more in an embodiment in association with a (and in an embodiment with each) primitive list that the primitive is included in. In an embodiment the indication is provided in the primitive list with (for) the primitive.

The indication may comprise (or consist of) a flag, such as a single bit, for which one value indicates that processing of one or more attributes of the vertices of the primitive has been performed, and the other value indicates that processing of one or more attributes has not been performed.

In this manner, during later processing using the primitive lists, it can be identified whether or not attribute processing (shading) has already been performed for a particular primitive.

As discussed above, preparing the primitive lists comprises including a primitive in the appropriate primitive list or lists. Including a primitive in a primitive list in an embodiment comprises including in the primitive list identifiers (e.g. indices) for each of the vertices of the primitive, and in an embodiment also comprises including in the primitive list an identifier (e.g. an index) for the primitive itself.

When preparing the primitive lists, rather than using the original identifiers (indices) for the vertices of the set of vertices for the render output (as provided by an application which requested the graphics processing), it may be advantageous to re-index the vertices, where appropriate, for example so as to use a smaller index range within a primitive list. In embodiments, the graphics processing system is operable to re-index vertices using generated internal indices (rather than using the original indices for the set of vertices for the render output, as provided by an application which requested the graphics processing).

In embodiments, when it is determined, based on a measure of the size of the primitive, to perform processing (shading) of one or more attributes for the vertices of the primitive, then in an embodiment the vertex indices which are included in the primitive list comprise (new, re-indexed) internal vertex indices (wherein the internal vertex indices identify the stored processed (shaded) attributes for the vertices).

In the alternative, when it is determined, based on a measure of the size of the primitive, not to perform processing (shading) of one or more attributes of the primitive, then in an embodiment the vertex indices which are included in the primitive list are in an embodiment the original vertex indices (e.g. corresponding to the original indices provided for the set of vertices to be processed for the render output, e.g. by an application requesting the graphics processing). The original vertex indices can then be used to identify the original (un-shaded) vertex attributes for the vertices of the primitive when using the primitive list to perform subsequent per-tile processing.

After the primitive lists have been prepared, the primitive lists may be, and are in an embodiment, used for subsequent processing (along with any stored processed attributes). The subsequent processing may comprise, for example, rendering.

The subsequent processing may be, and is in an embodiment, performed on a tile-by-tile basis (with each tile corresponding to a respective sub-region of the render output being processed separately (e.g. in turn)). The processing performed on a tile-by-tile basis may comprise any suitable and desired processing for rendering a tile of the render output, e.g. triangle setup, rasterising, depth culling, fragment shading, ray-tracing, etc.

The subsequent processing for a (and each) tile in an embodiment comprises identifying a primitive list or lists relevant to the tile to be processed (the relevant primitive list(s) each corresponding to a region of the render output which includes (some or all of) the tile), and using the identified primitive list(s) when processing the tile. This in an embodiment comprises identifying the primitives (e.g. reading the primitive identifiers and corresponding vertex identifiers) to be processed for the tile from the primitive list(s), e.g. by a primitive list reader (primitive list reading circuit), and then processing the read primitives.

In addition to reading primitives from the primitive list(s), in embodiments, it is also checked whether processing of one or more attributes of the vertices of the primitive has already been performed when preparing the primitive list (this is in an embodiment performed by checking a suitable indication, e.g. associated with (provided in) the primitive list, as discussed above).

When the indication indicates that processing (shading) for one or more attributes of the vertices of the primitive has already been performed when preparing the primitive list (such that one or more corresponding processed attributes have accordingly been stored for use in subsequent processing), the subsequent processing for a tile in an embodiment comprises reading the one or more processed (shaded) attributes for the vertices of the primitive from memory, in order to perform subsequent processing for the tile (e.g. such as rendering). The attributes which have already been shaded in an embodiment comprise both position and non-position attributes (and correspondingly the processed attributes data which is read from memory in an embodiment comprises both position and non-position attribute data).

When the indication indicates that processing (shading) for one or more attributes of the vertices of the primitive has not already been performed when preparing the primitive list (such that one or more processed (shaded) are not stored), then processing (shading) of the one or more attributes is in an embodiment performed prior to performing the subsequent processing (e.g. rendering) for a tile. For example, the primitive list reader (circuit) may trigger (issue a command) to perform processing of the one or more attributes before triggering (issuing a command) to perform the subsequent processing for the tile. The one or more attributes which are to be processed prior to performing the subsequent processing in an embodiment comprise at least one or more non-position attributes, and more in an embodiment comprise both position attributes and one or more non-position attributes.

Hence, in an embodiment, the method of operating the graphics processer comprises when performing subsequent processing of primitives of the set of primitives: identifying a primitive list relevant to a tile to be processed, identifying a primitive to be processed from the primitive list, and checking an indication for the identified primitive to determine whether processing of one or more attributes of the vertices of the primitive has already been performed (or not). When the indication indicates that processing of one or more attributes of the vertices of the primitive has already been performed, the method comprises reading the one or more processed attributes for the vertices of the primitive from memory, and performing subsequent processing of the primitive for the tile using the one or more processed attributes read from memory. When the indication indicates that processing of one or more attributes of the vertices of the primitive has not already been performed, the method comprises performing processing of one or more attributes of the vertices of the primitive prior to performing subsequent processing of the primitive for the tile.

Correspondingly, the graphics processor in an embodiment comprises a primitive list reading circuit which is configured to read a primitive list relevant to a tile to be processed, identify a primitive to be processed from the primitive list, and check an indication for the identified primitive to determine whether processing of one or more attributes of the vertices of the primitive has already been performed. When the indication indicates that processing of one or more attributes of the vertices of the primitive has already been performed, the primitive list reader triggers subsequent processing of the primitive for the tile (and in this case when subsequent processing requires stored processed attributes, the processed attributes are read from memory for the subsequent processing). When the indication indicates that processing of one or more attributes of the vertices of the primitive has not already been performed, the primitive list reader triggers processing of one or more attributes of the vertices of the primitive prior to triggering subsequent processing of the primitive for the tile.

When processing (shading) for one or more attributes of the vertices of a primitive is performed at the primitive list generation stage, the processed (shaded) attributes are in an embodiment stored in main memory. Conversely, when processing (shading) for one or more attributes of the vertices of a primitive is not performed at the primitive list generation stage, and is instead performed at a subsequent processing stage when using the primitive lists, the processed (shaded) attributes generated for the subsequent processing are in an embodiment stored in an intermediate, in an embodiment local, and in an embodiment on-chip storage, such as, and in an embodiment a cache of (or available to) the graphics processor (without being written to main memory).

To allow the downstream processing circuits (units) to read (identify) the relevant stored attribute data for the vertices of the primitives, the primitive list reader in an embodiment communicates the vertex identifiers (indices) for the vertices of the primitives (as read from the primitive lists) to the downstream units. The primitive list reader may also inform downstream processing circuits (units) which are to perform the subsequent processing (e.g. rendering) whether or not processing of one or more attributes was performed during the primitive list preparation stage (and accordingly whether the processed attributes are stored in "main" memory or intermediate (local) storage). The indication provided by (output by) the primitive list reader may comprise a flag (e.g. for each primitive) which indicates whether or not processing of one or more attributes was performed during the primitive list preparation stage. Based on this indication (and based on the vertex identifiers), the downstream processing circuits (units) will then read the processed position attributes from the appropriate memory location (e.g. from main memory or from intermediate (local) storage as appropriate).

The downstream processing circuits (units) in an embodiment read the processed attribute data as and when required for the subsequent processing for a tile. For example, it may be the case that a downstream processing circuit (unit) requires only processed position attribute data, only the processed non-position attribute data, or both processed position and non-position attribute data for vertices in order to perform processing (and accordingly the downstream processing circuit (unit) may read only the processed position attribute data, only the processed non-position attribute data, or both the processed position and non-position attribute data for the vertices).

Processed attribute data for vertices need not be read from storage by each and every downstream processing circuit (unit) requiring that data. In embodiments, one or more downstream processing circuits (units) are configured to convey (transfer) processed vertex attribute data (directly) to another downstream processing circuit (e.g. along with any other useful output data from processing performed by the downstream processing circuit) (such that the another downstream processing circuit does not need to read the processed vertex attribute data from storage, e.g. main memory or local memory).

The technology described herein also extends to the operation of using primitive lists in the manner disclosed herein.

Hence, in one embodiment, the technology described herein provides a method of operating a graphics processor when generating a render output using tile based rendering, in which a plurality of tiles of a render output being generated are rendered separately, and the rendered tiles are combined to form the render output, the method comprising:

identifying a primitive list relevant to a tile to be processed;

identifying a primitive to be processed from the primitive list;

checking an indication for the identified primitive to determine whether processing of one or more attributes of the vertices of the primitive has already been performed; and when the indication indicates that processing of one or more attributes of the vertices of the primitive has already been performed:

reading one or more processed attributes for the vertices of the primitive from memory, and performing processing of the primitive for the tile using the one or more processed attributes read from memory;

when the indication indicates that processing of one or more attributes of the vertices of the primitive has not already been performed:
performing processing of one or more attributes of the vertices of the primitive prior to performing processing of the primitive for the tile.

In another embodiment, the technology described herein provides a graphics processor configured to generate a render output using tile based rendering, in which a plurality of tiles of a render output being generated are rendered separately, and the rendered tiles are combined to form the render output, the graphics processor comprising:
a primitive list reading circuit configured to:
read a primitive list relevant to a tile to be processed;
identify a primitive to be processed from the primitive list;
check an indication for the identified primitive to determine whether processing of one or more attributes of the vertices of the primitive has already been performed; and
when the indication indicates that processing of one or more attributes of the vertices of the primitive has already been performed:
trigger processing of the primitive for the tile;
when the indication indicates that processing of one or more attributes of the vertices of the primitive has not already been performed:
trigger processing of one or more attributes of the vertices of the primitive prior to processing of the primitive for the tile.

As will be appreciated by those skilled in the art, these embodiments of the technology described herein can, and in an embodiment do, include any one or more or all of the features of the technology described herein described herein.

The operation of using primitive lists may comprise any of the features disclosed herein. For example, as discussed above, the primitive list reader circuit may provide a suitable indication for use by downstream processing circuits (units) which are performing the processing of primitives for a tile (e.g. such as a rasterising circuit, depth testing (culling) circuit, and fragment shading circuit) of whether or not processing of one or more attributes of the vertices of the primitive has already been performed when preparing the primitive lists, and accordingly whether those downstream processing circuits should read processed attribute data for the vertices of the primitives from main memory or local, intermediate, storage (as discussed above).

The above describes the main elements of the graphics processor and graphics processing pipeline that are involved in the operation in the manner of the technology described herein. As will be appreciated by those skilled in the art, the graphics processor can otherwise include and execute, and in an embodiment does include and execute, any one or one or more, and in an embodiment all, of the other processing stages and circuits that graphics processors and graphics processing pipelines may (normally) include. Thus, for example, the graphics processor may also include a primitive setup circuit, a rasteriser circuit and fragment shading circuit, a depth (or depth and stencil) tester, a blender, a tile buffer, a write out circuit, etc.

In an embodiment, the graphics processor comprises, and/or is in communication with, one or more memories and/or memory devices that store the data described herein, and/or that store software for performing the processes described herein. The graphics processor may also be in communication with a host microprocessor, and/or with a display for displaying images based on the output of the graphics processor.

The render output to be generated may comprise any output that can and is to be generated by a graphics processor and processing pipeline, such as frames for display, a render-to-texture output, etc. In an embodiment, the output is an output frame, and in an embodiment an image.

In an embodiment, the various functions of the technology described herein are carried out on a single graphics processing platform that generates and outputs the (rendered) data that is, e.g., written to a frame buffer for a display device.

The various functions of the technology described herein can be carried out in any desired and suitable manner. For example, unless otherwise indicated, the functions of the technology described herein herein can be implemented in hardware or software, as desired. Thus, for example, unless otherwise indicated, the various functional elements, stages, and "means" of the technology described herein may comprise a suitable processor or processors, controller or controllers, functional units, circuitry, circuits, processing logic, microprocessor arrangements, etc., that are configured to perform the various functions, etc., such as appropriately dedicated hardware elements (processing circuits/circuitry) and/or programmable hardware elements (processing circuits/circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry/circuits, etc., if desired.

Furthermore, unless otherwise indicated, any one or more or all of the processing stages of the technology described herein may be embodied as processing stage circuits, e.g., in the form of one or more fixed-function units (hardware) (processing circuits), and/or in the form of programmable processing circuits that can be programmed to perform the desired operation. Equally, any one or more of the processing stages and processing stage circuitry of the technology described herein may be provided as a separate circuit element to any one or more of the other processing stages or processing stage circuits, and/or any one or more or all of the processing stages and processing stage circuits may be at least partially formed of shared processing circuits.

Subject to any hardware necessary to carry out the specific functions discussed above, the graphics processor can otherwise include any one or more or all of the usual functional units, etc., that graphics processors include.

It will also be appreciated by those skilled in the art that all of the described embodiments of the technology described herein can, and, in an embodiment, do, include, as appropriate, any one or more or all of the features described herein.

The methods in accordance with the technology described herein may be implemented at least partially using software e.g. computer programs. It will thus be seen that the technology described herein herein may provide computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a display controller, or microprocessor system comprising a data processor causes in conjunction with said data processor said controller or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus, in a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CDROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrinkwrapped software, preloaded with a computer system, for example, on a system ROM or fixed disk, or distributed from a server or electronic bulletin board over a network, for example, the Internet or World Wide Web.

A number of embodiments of the technology described herein will now be described.

As discussed above, the technology described herein relates to tile-based graphics processing in which primitive lists are prepared in order to identify primitives which are to be processed for regions of a render output.

In the technology described herein, as well as preparing the primitive lists, it is also determined whether to perform additional vertex attribute processing (shading) for vertices of the primitive, or whether to simply include the primitive in a primitive list without performing further attribute shading.

FIG. 1 shows an exemplary data processing system in which the technology described herein may be implemented. The data processing system shown in FIG. 1 is an exemplary system on chip (SoC) graphics processing system 8 that comprises a host processor comprising a central processing unit (CPU) 1, a graphics processor (GPU) 2, a display processor 3, and a memory controller 5. As shown in FIG. 1, these units communicate via an interconnect 4 and have access to off-chip memory 6. In this system, the graphics processor 2 will render frames (images) to be displayed, and the display processor 3 will then provide the frames to a display panel 7 for display.

In use of this system, an application 9 (e.g. such as a game), executing on the host processor (CPU) 1 will, for example, require the display of frames on the display panel 7. To do this, the application will submit appropriate commands and data to a driver 10 for the graphics processor 2 that is executing on the CPU 1. The driver 10 will then generate appropriate commands and data to cause the graphics processor 2 to render appropriate frames for display and to store those frames in appropriate frame buffers, e.g. in the main memory 6. The display processor 3 will then read those frames into a buffer for the display from where they are then read out and displayed on the display panel 7 of the display.

Figure 2:
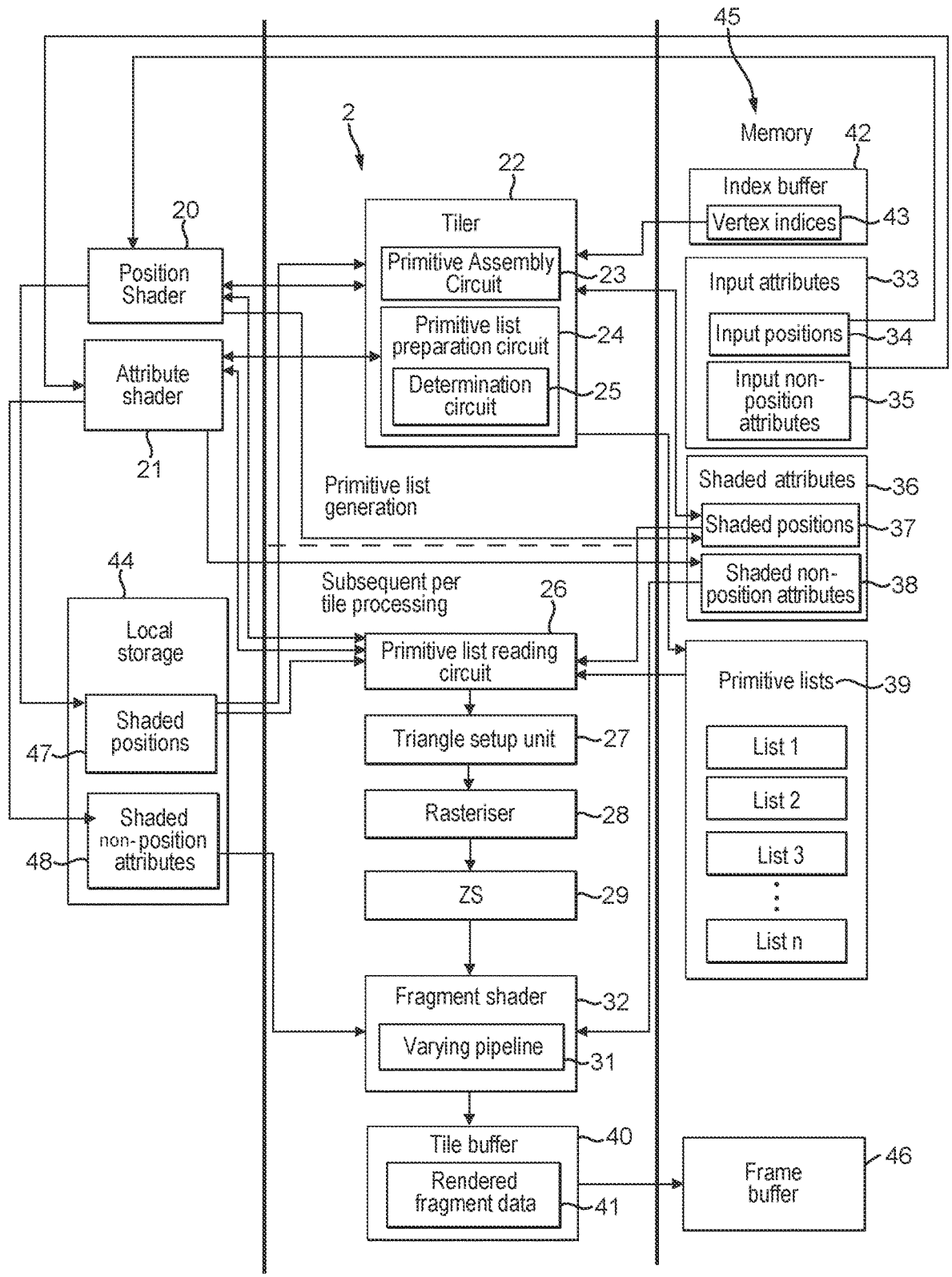
FIG. 2 shows schematically an arrangement of a graphics processor that can operate in accordance with the technology described herein.

FIG. 2 shows schematically a graphics processor 2 that may be operated in accordance with the technology described herein. The graphics processor comprises various processing circuits, comprising inter alia a position shader (position shading circuit) 20, an attribute shader (attribute shading circuit) 21, a tiler (tiling circuit) 22, a primitive list reader (primitive list reading circuit) 26, a triangle setup circuit 27, a rasteriser (rasterising circuit) 28, a depth testing circuit (ZS) 29, and a fragment shader 32 (which includes a varying pipeline 31).

The graphics processor also has local ("on-chip") storage 44, such as a cache, and has access to an external (main) memory 45.

In the present embodiment, the graphics processor 2 performs processing of primitives, such as triangles, in order to generate a render output, such as an image for display. The primitives processed by the graphics processor may comprise a set of primitives (e.g. corresponding to a "draw call" requested by an application executing on the host processor), the set of primitives being formed from an appropriate set of vertices. The set of vertices for the "draw call" may be indicated to the graphics processor in any desired and suitable manner, such as by storing an identifier (e.g. a vertex index 43) for each vertex of the set of vertices in a suitable index buffer 42 in main memory 45 accessible by the graphics processor.

The position shader 20 of the graphics processor is a programmable processing circuit configured to transform input positions 34 of vertices (e.g. corresponding to positions in a "model space") to the render output "screen space", so as to generate processed (shaded) position attributes 37, 47 for the vertices. The attribute shader 21 is a programmable processing circuit configured to receive input non-position attributes 35 of vertices (the non-position attributes, also known as "varyings", comprising, e.g. colour, light, normal, texture coordinates, etc, for the vertices), and to process (transform) the non-position attributes appropriately for the render output so as to generate processed (shaded) non-position attributes 38, 48.

The position shading circuit 20 and attribute shading circuit 21 may comprise separate circuits, however in an embodiment these are formed by the same overall (programmable) shading circuit (and so share circuitry).

The tiler 22 comprises a primitive assembly circuit 23, and a primitive list preparation circuit 24.

The primitive assembly circuit 23 is configured to assemble a set of primitives (e.g. for a draw call) from an appropriate set of vertices. Assembling the set of primitives may be performed in any desired and suitable manner, e.g. comprising reading indices 43 identifying vertices of the set of vertices (e.g. from the index buffer 42), and then determining the vertices for each primitive of the set of primitives based on primitive configuration information. The primitive configuration information indicates how the primitives are to be assembled, e.g. in the form of simple triangles, triangle strips, or triangle fans, etc.

The primitive list preparation circuit 24 determines the primitive list or lists in which to include each primitive in the set of primitives (this process may also be referred to as "binning" the primitives into primitive lists). When determining the primitive list or lists in which to include a primitive, the primitive list preparation circuit uses the shaded (transformed) positions 47 for the vertices of the primitive to determine which region(s) of the render output the primitive falls within (e.g. using bounding box binning), and then includes the primitive in an appropriate list or lists. The primitive lists 39 are stored in the memory 45.

Thus, as shown in FIG. 2, the tiler 22 is able to control the position shader 20 to perform position shading of vertices for this purpose.

The primitive list preparation circuit 24 comprises a determination circuit 25 in accordance with the technology described herein, which performs a determination based on a measure of the size of a primitive of whether or not to perform (trigger) shading of non-position attributes for the vertices of each primitive during the primitive list preparation stage (and whether or not to discard shaded position attributes 47 for the vertices of each primitive after the primitive list preparation stage). The primitive list preparation determination based on a measure of the size of a primitive, and the corresponding processing, will be discussed in further detail below.

After primitive list preparation has been performed for a set of primitives, subsequent processing may be performed using the primitive lists, comprising rendering tiles of the render output. This subsequent processing is performed on a tile-by-tile basis (for each tile separately, e.g. in turn). The subsequent per-tile processing is performed by circuits such as the primitive list reader (primitive list reading circuit) 26, triangle setup unit 27, rasteriser 28, a depth testing circuit 29, and the fragment shader 32.

The primitive list reader 26 is configured to read primitive lists 39 relevant to a tile under consideration (i.e. those primitive lists which correspond to a region of the render output which spans the tile under consideration), and to identify the primitives in those primitive lists. In accordance with the technology described herein, the primitive list reader 26 is also configured to request (trigger) shading of position and/or non-position attributes for the vertices of a primitive by the position shader or attribute shader respectively, if those shaded attributes are not present in memory 45. The operation of the primitive list reader will be discussed in greater detail below.

The triangle setup unit 27 performs appropriate triangle setup operations for primitives identified by the primitive list reader 26, such as deriving edge equations for the primitives, determining rates of change of attribute values (e.g. such as colour values) between the vertices of primitives, etc.

The rasteriser 28 rasteriser each primitive into fragments, each fragment representing a set of one or more single sampling positions of the render output.

The depth testing circuit 29 performs depth testing to cull fragments which will not be visible in the render output (e.g. which are behind other opaque primitives).

Fragment shading 32 is then performed to generate rendered fragment data 41 for the fragments received from the rasteriser 28 (and that pass the depth test). As shown in FIG. 2, the fragment shader 32 may use a varying pipeline 31 to interpolate non-position attributes 48 for the fragments received from the rasterizer 28 (and that pass the depth test) when generating the rendered fragment data 41.

The rendered fragment data 41 is stored in a tile buffer 40 (in the local storage 44 of the graphics processor 2).

Once the processing for a tile is complete (once all the relevant primitives for the tile have been processed), the rendered fragment data 41 stored in the tile buffer 40 is written to a frame buffer 46 in the memory 45 which stores the overall render output (frame (image)), e.g. to be displayed on a display (e.g. a display screen).

As noted above, the graphics processor 2 comprises local ("on-chip") storage 44, and has access to a main memory 45. As shown in FIG. 2, vertex indices 43 for a set of vertices for a set of primitives which are to be processed to form a render output, and input attributes 33 for vertices of the set of vertices (which are, for example, provided by the graphics processor driver and/or an application running on a host system (microprocessor) of the graphics processor 2) may be stored in main memory 45. The main memory may also store the primitive lists 39 which contain data, commands etc. for respective primitives, as generated by the primitive list preparation circuit 24.

As shown in FIG. 2, and as will be discussed in more detail below, depending on the processing which is performed, shaded position attributes and shaded non-position attributes may be stored in main memory 45 or in local storage 44.

Figure 3:
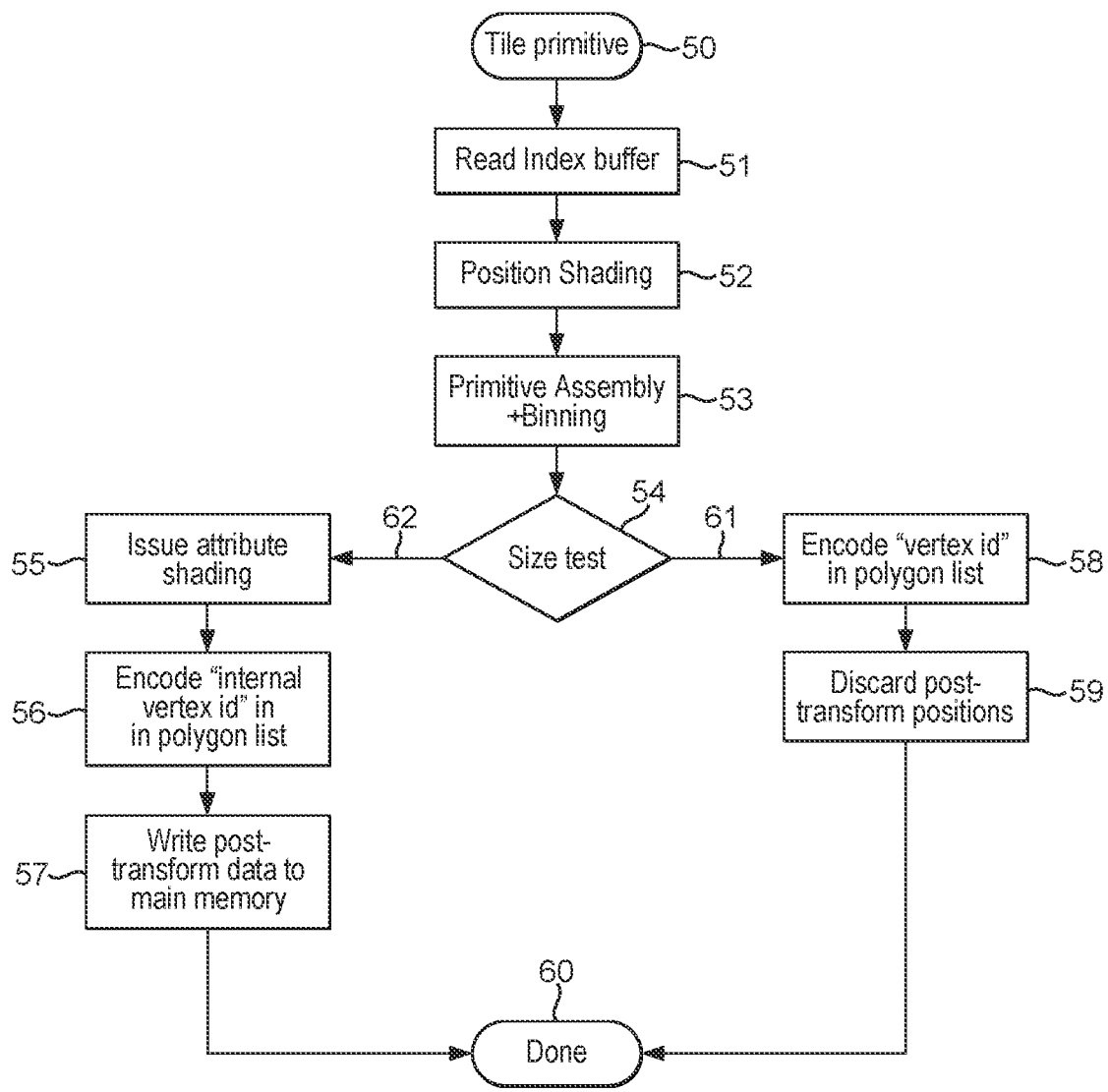
FIG. 3 is a flowchart showing processing performed to generate primitive lists in an embodiment.

FIG. 3 is a flowchart showing processing that is performed in embodiments of the technology described herein when tiling primitives (binning primitives into primitive lists).

As shown in FIG. 3, for a set of primitives 50 to be processed for a render output (e.g. corresponding to a draw call), an index buffer is read (step 51) to identify the set of vertices to be used for the set of primitives. The position attributes of the vertices of the set are then processed (shaded) (step 52) to transform the position attributes as appropriate for the render output. (The position shading may be performed by a position shading circuit 20 as described above.) The shaded positions are then used for primitive assembly and sorting of primitives into primitive lists (binning) (step 53).

The primitive assembly may be performed by a primitive assembly circuit 23, as described above, and the binning of primitives into primitive lists may be performed by a primitive list preparation circuit 24, as discussed above.

Figure 6:
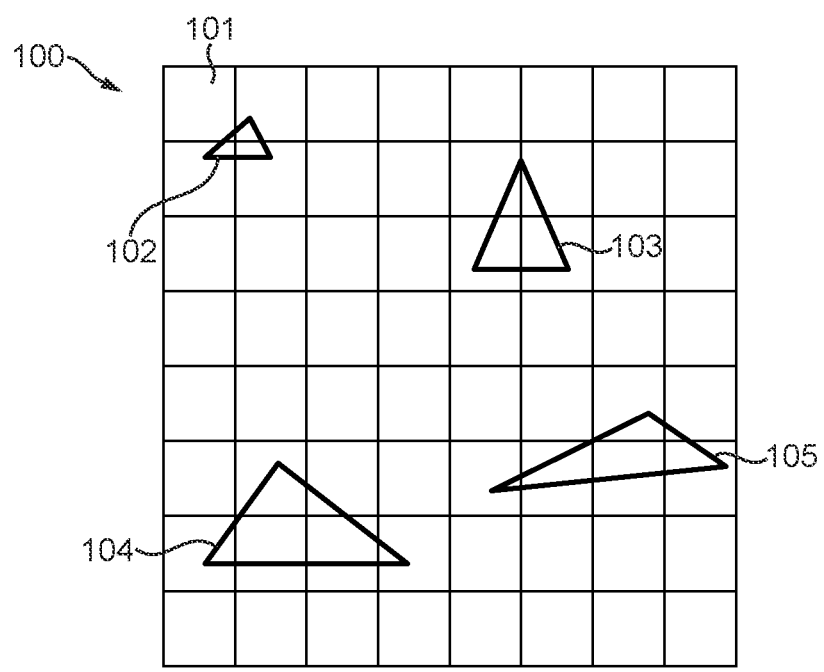
FIG. 6 shows an exemplary render output which may be processed as plural tiles.

FIG. 6 shows an exemplary render output 100 and a set of primitives (in this case triangles) comprising primitives 102, 103, 104 and 105 which are to be processed for the render target output, and requiring binning into appropriate primitive lists.

The render output 100 is sub-divided into plural tiles (sub-regions) 101. In the example shown, the render output is divided into an 8×8 array of tiles. However the render output could be divided into any desired and suitable number of tiles, e.g. in dependence on the size of tiles that the graphics processor is configured to use.

Figure 7:
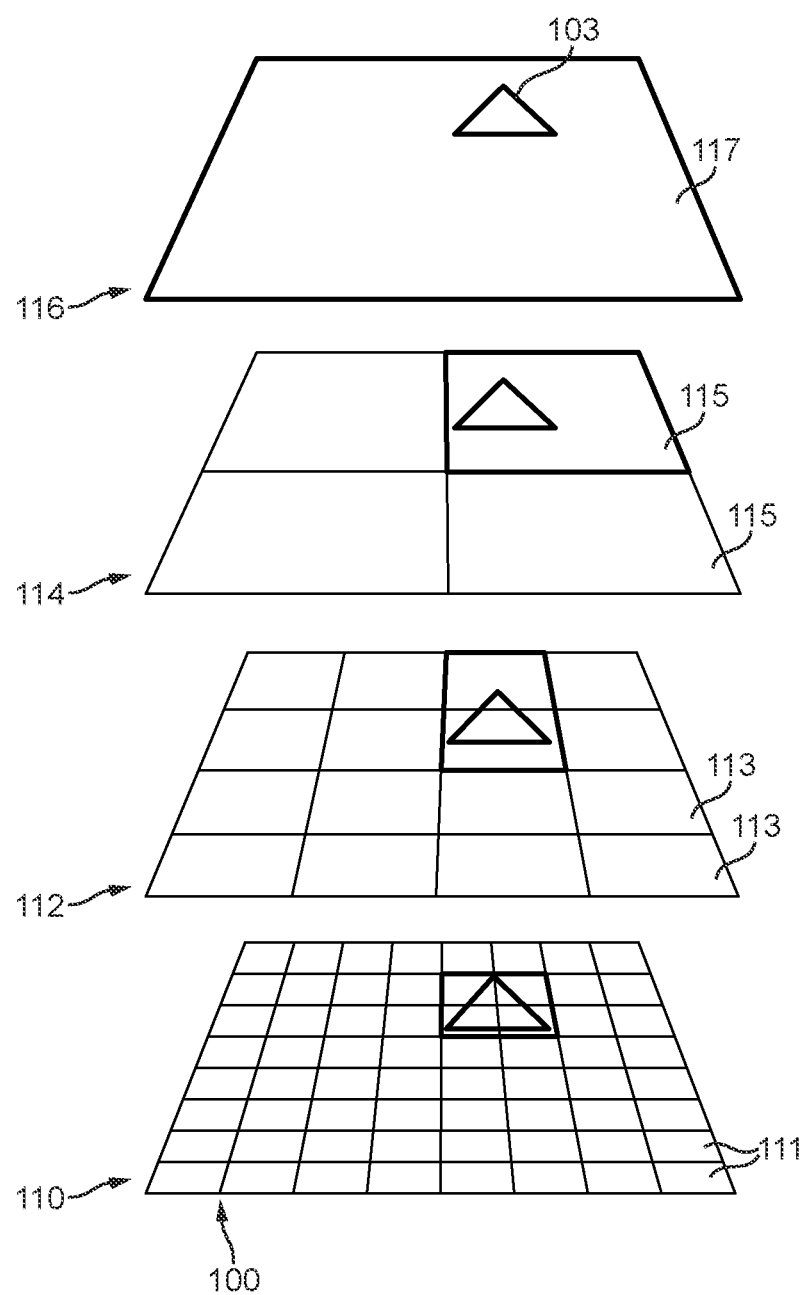
FIG. 7 shows an exemplary hierarchy of set of regions, each set of regions spanning a render output, wherein a primitive list can be prepared for each region of the sets of regions.

In the present embodiment, the primitive list preparation circuit is configured to prepare a primitive list for each tile 101 of the render output and to also prepare primitive lists for larger regions of the render output. FIG. 7 illustrates this, and shows a hierarchy of sets of regions 110, 112, 114, 116, for which primitive lists can be prepared. Each set of regions spans the entire render output, and progressively higher layers (levels) of the hierarchy have regions 111, 113, 115, 117 of progressively larger size. The lowest layer in the hierarchy comprises regions 111 which are the size of a single tile of the render output, and higher layers (levels) in the hierarchy comprise regions which encompass progressively more tiles comprising 2×2 tiles, 4×4 tiles and 8×8 tiles respectively (however any suitable region size could be used at each layer of the hierarchy).

As noted above, when binning a primitive into primitive lists, the primitive list preparation circuit determines which region(s) a primitive falls within (each region having a corresponding a primitive list), and then selects which primitive list(s) to include the primitive in. Selecting which primitive list(s) to include a primitive in may comprise selecting (determining) a particular level of the hierarchy at which to list the primitive. In this regard, there may be a balance to be struck between the number of lists a primitive is written to, and the size of the regions of the render output it is listed for. Considering primitive 103 for example, if this primitive is listed at the lowest level 110 of the hierarchy, it would be written to four primitive lists corresponding to the four regions spanned by the primitive, whereas if it is written to a higher level in the hierarchy then it would be written to fewer primitive lists (e.g. for level 114, only one primitive list is needed). However, if primitive 103 is written at a relatively higher level of the hierarchy (for larger render output regions), it may need to be re-read more times as the primitive list for a region will be reused for each rendering tile it covers during subsequent per-tile processing. In embodiments, a cost function that considers costs read, processing and write costs may be used to determine at which level of the hierarchy a primitive should be listed, e.g. to optimise this balance.

Referring back to FIG. 3, after primitive assembly has been performed (and after the primitive lists a primitive should be included in have been determined) (step 53), a determination circuit of the primitive list preparation circuit determines whether or not to perform processing of one or more (non-position) attributes for the vertices of the primitive, based on a measure of size of the primitive (step 54).

In particular, and as will be discussed further below, for relatively larger primitives, it is determined to perform processing of one or more (non-position) attributes for the vertices of the primitive, whereas for relatively smaller primitives, it is determined not to perform processing of one or more (non-position) attributes for the vertices of the primitive.

When it is determined based on the measure of the size of the primitive (step 54) to perform processing of one or more non-position attributes for the vertices of the primitive, then path 62 in FIG. 3 is followed.

In this case, the primitive list preparation circuit triggers shading for one or more non-position attributes of the vertices of the primitive (step 55) (by the attribute shader 21). The primitive list preparation circuit then includes the primitive in the appropriate primitive list(s) (step 56), and the shaded non-position attribute data (and also the shaded position attribute data) for the vertices of the primitive is stored in main memory (step 57). In this case, including a primitive in the appropriate primitive list(s) comprises re-indexing the vertices to provide "internal" vertex ids (indexes) for the vertices of the primitive, and including the "internal" vertex ids in the primitive list (for example, along with an index for the primitive). (It is assumed in this regard that vertices are re-indexed as part of the initial vertex and primitive processing, e.g. to allow a reduced number of indices (smaller index range) for the vertices to be used.) The "internal" vertex ids are also used to identify the stored shaded attribute data for the vertices.

In the alternative, when it is determined based on the measure of the size of the primitive (step 54) not to perform processing of one or more non-position attributes for the vertices of the primitive, then path 61 in FIG. 3 is followed.

In this case, the primitive list preparation circuit includes the primitive in the appropriate primitive list(s) (step 58) by writing to the primitive list the original (input) indices for the vertices of the primitive (corresponding to the vertex indices provided by the application requesting graphics processing, and stored in the index buffer) (for example, along with an index for the primitive). In this case, the original (input) indices for the vertices are used in order to allow the original (raw, un-shaded) attribute data for those indices to be identified and read from main memory during subsequent per-tile processing. Any shaded position attributes for the vertices of the primitive are discarded and not stored for later use (step 59).

When preparing the primitive list(s) for a primitive, e.g. as set out in FIG. 3, the primitive list preparation circuit also includes an indication in the primitive list(s) (e.g. with the primitive) which indicates whether or not shading of one or more non-position attributes has been performed based on the determination based on the size of the primitive. The indication may be included in the primitive list(s) as part of including the primitive in the primitive list(s) (steps 56 and 58 in FIG. 3). The indication may be, for example, a bit for which one value indicates that shading of non-position attributes has been performed, and the other value indicates that shading of non-position attributes has not been performed.

As discussed above, the determining whether (or not) to perform shading of one or more (non-position) attributes of the vertices of a primitive is based on a measure of size of the primitive.

For example, with reference to FIG. 6, primitives 102 and 103 which span only four tiles 101 of the render output 100 may be sufficiently small that a memory bandwidth saving associated with not performing shading of non-position attributes outweighs a potential arithmetic processing cost of repeating shading of non-position attributes for each tile spanned by the primitives during subsequent per-tile processing. In comparison, for relatively larger primitives 104 and 105 which each span eight tiles of the render output, it may be preferable to perform attribute shading during the tiling stage such that the shaded attributes can simply be read from memory during subsequent per-tile processing (rather than repeating attribute shading for each tile spanned by those primitives).

In the present embodiments, the measure of size of a primitive is a measure of the number of tiles spanned by the primitive. The measure of size of a primitive is determined based on the primitive list(s) which a primitive is to be included in. In particular, the measure of size of a primitive accounts for the number of primitive lists in which a primitive is included and the size of the regions (e.g. the layer (level) of the hierarchy of sets of regions) for those primitive list(s).

Determining whether to perform processing of one or more attributes for the primitive then comprises comparing the measure of size of the primitive against a threshold measure of size.

In the present embodiments, the measure of size of a primitive (and the threshold against which it is compared) is configured (set) such that if a primitive is listed in four or fewer primitive lists corresponding to a smallest region size 111 (lowest layer 110 of the hierarchy of sets of regions) only, then shading of one or more non-position attributes of the vertices of the primitive is not performed when preparing primitive lists. As noted above, the smallest region size may be a single tile in size.

The measure of size of a primitive (and the threshold against which it is compared) is also configured (set) such that if a primitive is listed in any primitive lists corresponding to a region 113, 115, 117 with a size larger than a smallest region size (a level 112, 114, 116, higher than a lowest level 110 of the hierarchy of sets of regions), then shading of one or more non-position attributes of the vertices of the primitive is performed when preparing primitive lists. Of course, alternative size measures could be used.

The measure of size of the primitive (and the threshold against which it is compared) could be configured (set) as desired, e.g. to balance memory bandwidth and arithmetic processing costs associated with performing (or not performing) processing of one or more non-position attributes when preparing primitive lists. The threshold is in an embodiment set according to a cost calculation (assessment) which accounts for the memory bandwidth and arithmetic processing costs associated with performing (or not performing) processing of one or more non-position attributes when preparing primitive lists. The threshold may be fixed or could be updated in use, e.g. by updating the cost calculation appropriately.

The process of FIG. 3 is performed for each primitive in the set of primitives which are to be processed to form the render output.

Figure 4:
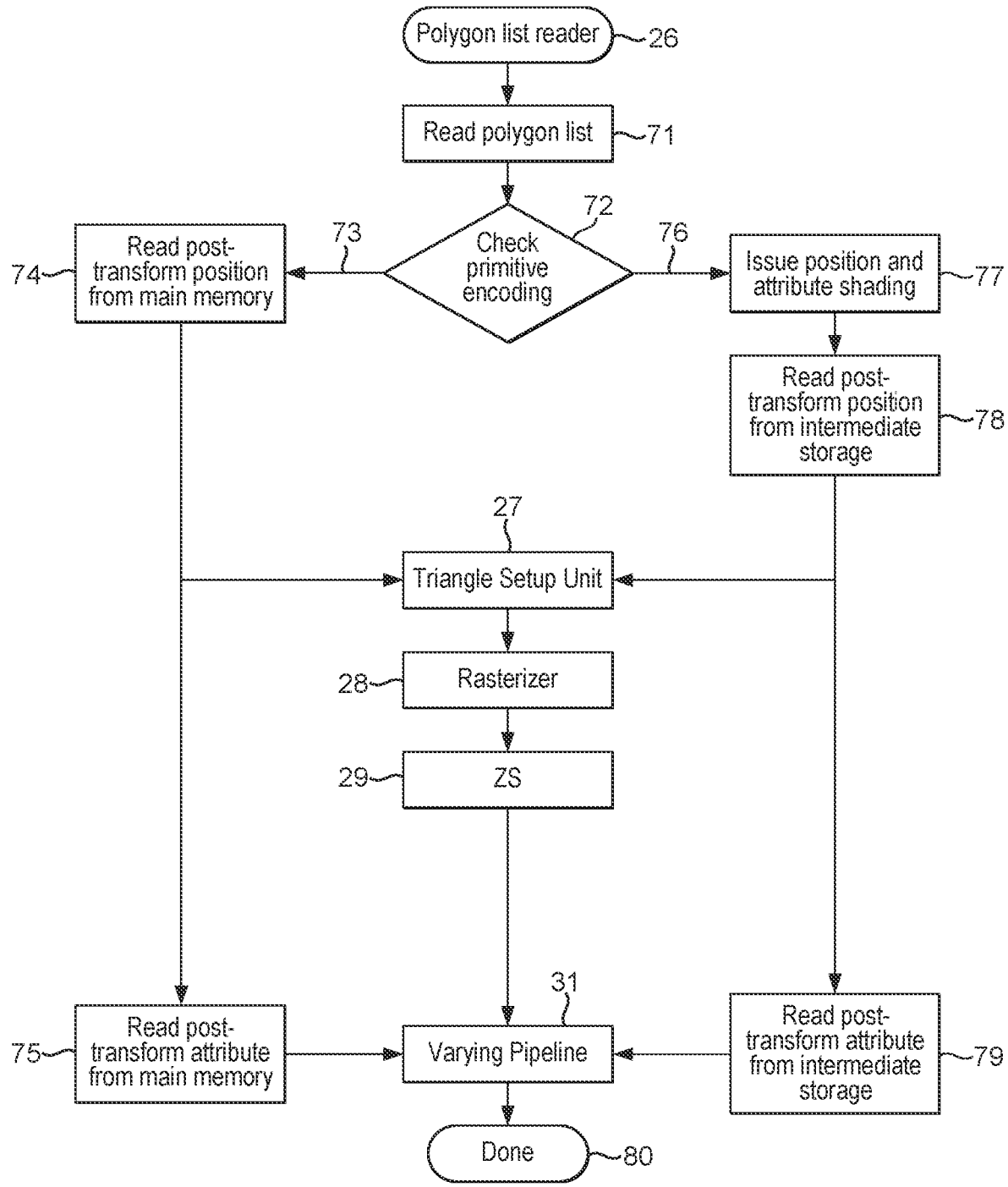
FIG. 4 is a flowchart showing subsequent per-tile processing in an embodiment.

After the primitive lists have been prepared as set out in FIG. 3, the primitive lists may be used for performing subsequent per-tile processing, e.g. such as rendering. FIG. 4 is a flowchart showing the subsequent per-tile processing in the present embodiments.

As shown in FIG. 4, when performing processing for a tile of the render output, the primitive list reader (polygon list reader) 26 first reads a (each) primitive list relevant to the tile (step 71) (i.e. a (each) primitive list which corresponds to a region which spans at least the tile under consideration). The primitive list reader checks (step 72), for a (each) primitive in a (each) primitive list, the indication provided in the primitive list which indicates whether or not shading of one or more non-position attributes for the vertices of the primitive was performed during the tiling stage.

If the indication provided in a primitive list indicates that shading has not already been performed for one or more non-position attributes of the vertices of a primitive then path 76 in FIG. 4 is followed, and the primitive list reader triggers shading of the non-position attributes of the vertices of the primitive by the attribute shader and also triggers shading of position attributes by the position shader (since these will have been discarded, as explained with regards to FIG. 3) (step 77). The so-shaded non-position and position attributes for the vertices of the primitive are then stored in intermediate (local) storage (e.g. a cache).

Alternatively, if the indication provided in a primitive list indicates that shading has already been performed for one or more non-position attributes of the vertices of a primitive then path 73 in FIG. 4 is followed, and the primitive list reader does not trigger shading of the non-position attributes nor of the position attributes at this stage.

The primitive list reader then communicates the relevant primitives (and their vertices, e.g. using the relevant vertex indices) for the tile under consideration to downstream units (e.g. such as the triangle setup unit) which are to process the primitives to generate the render target output. The primitive list reader also indicates to the downstream units whether the shaded non-position and position attributes for the vertices of a primitive are stored in main memory, or whether they are stored in intermediate (local) memory (such that the downstream units can then retrieve attribute data, as required, from the main memory or intermediate storage as appropriate). The indication provided by the primitive list reader to the downstream units is based on the indication for the primitive which was provided in the primitive list. The indication provided by the primitive list reader may, for example, be stored in suitable local (on-chip) storage for access by the downstream units, e.g. as part of appropriate metadata for the primitives.

The primitives identified by the primitive list reader are processed by the downstream processing circuits/units in order to generate a tile of the render output. For example, as shown in FIG. 4, the primitives may be processed by the triangle setup unit 27, rasteriser 28, depth tester 29, and fragment shader 32. The output from the subsequent per-tile processing may be written to suitable storage, such as a tile buffer 40.

The triangle set-up unit may require only the shaded position attributes (and not the shaded non-position attributes) of the vertices of a primitive in order to perform triangle set-up and so, as shown in FIG. 4, the triangle set-up unit 27 will read the shaded position attributes only (from main memory or intermediate storage as appropriate). The shaded position attributes obtained by the triangle set-up unit may be communicated (along with any relevant output data from the triangle set-up unit) to a next downstream unit, which is the rasteriser 28, and so on to the depth tester 29 and fragment shader 32.

The fragment shader 32 (additionally) requires shaded non-position attributes for the vertices of a primitive in order to perform its processing, and so reads the shaded position attributes (from main memory or intermediate storage as appropriate), as shown in FIG. 4.

The output from the fragment shader 32 is stored as a rendered output tile which is then written to suitable storage.

Subject to the operation described above, the processing performed by the downstream processing units may be performed as desired, for example, and in an embodiment, in the usual manner for those processing units and for the graphics processor and graphics processing system in question.

Although FIG. 4 shows rendering by rasterization and fragment shading, other forms of rending could be performed, e.g. such as ray tracing.

The process of FIG. 4 may be repeated for each tile of the render output, until the entire render output is generated.

Figure 5:
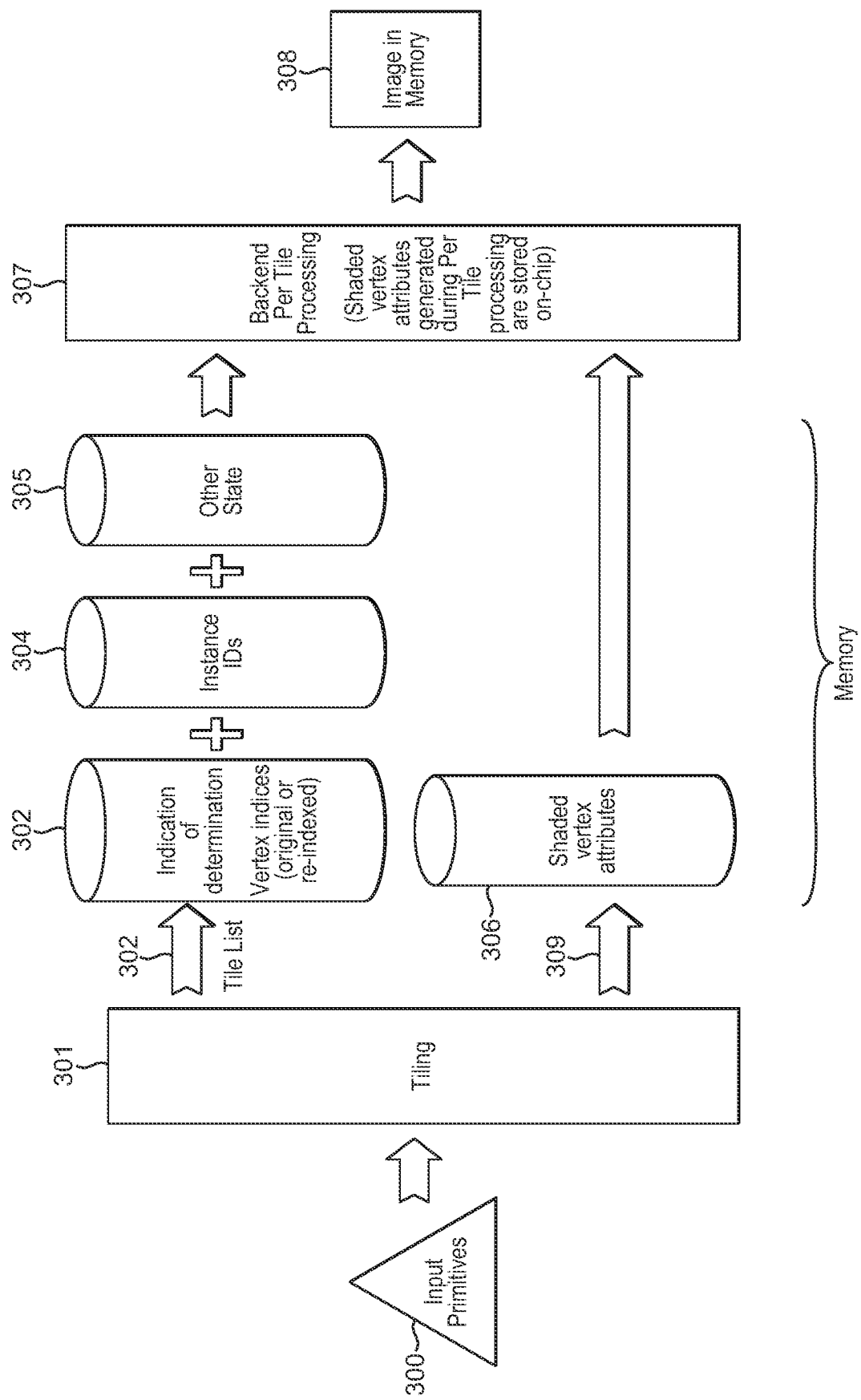
FIG. 5 is an overview of data flow when performing graphics processing in an embodiment.

FIG. 5 is an overview of the data flow when performing graphics processing in the manner of the present embodiments.

As shown in FIG. 5, a set of primitives 300 to be processed for a render output are provided for primitive assembly and binning (tiling 301).

Prior to (or as part of) primitive assembly the input positions of the vertices for the primitives are shaded to provide shaded position attributes. When binning the primitives of the set of primitives into primitive lists, it is determined, as discussed above, based on a measure of size of the primitives whether or not to perform shading of one or more non-position attributes for a primitive at the tiling stage (wherein for relatively smaller primitives it will be determined not to perform shading of one or more non-position attributes, and for relatively larger primitives it will be determined to perform shading of one or more non-position attributes).

The output from the tiling 301 is a set of primitive lists 302, the primitive lists including for each primitive an indication (e.g. a bit) indicating whether or not shading of non-position attributes has been performed (i.e. indicating whether or not it was determined based on a measure of the size of the primitive to performed shading of non-position attributes), and identifiers (indices) for each vertex of the primitive 303. As discussed above, depending on whether (or not) it was determined based on a measure of the size of the primitive to perform shading of one or more non-position attributes of the vertices of the primitive, the vertex indices which are stored in the primitive list will be either re-indexed vertex indices or the original vertex indices (as provided by the application which requested the graphics processing). The primitive lists are written to main memory.

In the case where it was determined based on a measure of the size of the primitive to not perform shading of one or more non-position attributes of the vertices of the primitive, then any necessary instance IDs to identify the instance an invocation of the vertex shader relates to (e.g. to indicate a repeated render or a render from a different view) are also be stored in main memory with the primitive lists. Other state information 305 regarding the primitives (such as a draw ID which would be invariant for all primitives within a draw call) may also be stored in main memory with the primitive lists, as required.

Also output from the tiling stage 301 and written to main memory are the shaded non-position attributes (and shaded position attributes) 306 for those primitives for which shading of non-position attributes has been performed in response to the determination based on the measure of size of the primitive. For primitives for which shading of non-position attributes has not been performed in response to the determination based on the measure of size of the primitive, then no such non-position attributes are generated or stored (and the shaded position attributes for such primitives are also discarded without being stored).

During subsequent per-tile processing 307 using primitive lists relevant to a tile under consideration, shading of position and non-position attributes for the vertices of the primitive is performed (if not already done when preparing the primitive lists), and the shaded position and non-position attributes generated during the per-tile processing are stored in local, intermediate storage (e.g. an on-chip buffer). For primitives for which position and non-position attributes were shaded and stored to main memory when preparing the primitive lists, the shaded position and non-position attributes 306 for the vertices of those primitives are read from main memory during the per-tile processing 307. The output from the per-tile processing 307 is a render output (e.g. image) 308 which may be stored, e.g. in a frame buffer in memory.

In embodiments, the determination based on a measure of size of a primitive (step 54 of FIG. 3) may be selectively disabled, based on one or more criteria being met (e.g. when one or more of the following is required/used for generating the render output: tessellation, one or more geometry shading render passes, Multi-view rendering, Future task rendering, Mesh shaders, Multisample Anti-Aliasing (MSAA), and Multiple Render Targets (MRT)).

The determination based on a measure of size of a primitive may be disabled in response to an indication from the driver for the graphics processor.

When the determination is disabled, the graphics processor may revert to a particular default operation. In an embodiment, the default is to perform shading of non-position attributes when preparing the primitive lists (path 62 in FIG. 3). The primitive list preparation circuit will then indicate in the primitive lists that shading of non-position attributes for the vertices of a primitive has been performed.

Hence, it can be seen that in various embodiments of the technology described herein, a measure of the size of a primitive is used, when preparing primitive lists, to determine whether or not to process (shade) one or more position attributes for the vertices of the primitive. Subsequent processing for the primitives is then performed in a manner which accounts for this.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a graphics processor when generating a render output using tile based rendering, in which a plurality of tiles of a render output being generated are rendered separately, and the rendered tiles are combined to form the render output, the method comprising:
   preparing one or more primitive lists for the render output, each primitive list of the one or more primitive lists for the render output listing primitives of a set of primitives to be processed for the render output to be processed for a respective region of the render output, each primitive having associated with it one or more vertices; and
   for a primitive of the set of primitives to be processed for the render output to be included in a primitive list or lists of the one or more primitive lists for the render output:
      determining, based on a measure of the size of the primitive, whether to perform processing of one or more attributes of one or more of the vertices of the primitive; and
      when it is determined based on the measure of the size of the primitive to perform said processing of one or more attributes of one or more vertices of the primitive, performing said processing of one or more attributes of one or more vertices of the primitive and storing the processed attribute or attributes for use in subsequent processing of the primitive, as well as including the primitive in said primitive list or lists;
      when it is determined based on the measure of the size of the primitive to not perform said processing of one or more attributes for one or more vertices of the primitive, including the primitive in said primitive list or lists without also performing said processing of one or more attributes for one or more vertices of the primitive in response to the primitive size determination.

2. The method of claim 1, wherein:
   when the measure of the size of the primitive indicates the primitive is larger than a threshold measure of size, then it is determined to perform the processing of the one or more attributes of one or more of the vertices of the primitive; and when the measure of the size of a primitive indicates the primitive is smaller than a threshold measure of size, then it is determined not to perform the processing of the one or more attributes of one or more of the vertices of the primitive.

3. The method of claim 1, wherein the measure of size of the primitive is a measure of a number of tiles of the render output that the primitive spans.

4. The method of claim 1, wherein the measure of the size of the primitive is determined based on the number of primitive lists in which a primitive is to be listed and/or based on the size of the regions for those primitive lists.

5. The method of claim 1, further comprising selectively disabling the determination based on the measure of size of the primitive.

6. The method of claim 1, wherein the one or more attributes which are processed based on the determination based on a measure of the size of a primitive comprise one or more non-position attributes.

7. The method of claim 1, comprising:

processing one or more position attributes for the vertices of the primitives in the set of primitives, to provide processed position attributes for use when preparing the one or more primitive lists; and when it is determined based on the measure of the size of a primitive not to perform processing of one or more attributes, discarding the one or more processed position attributes for the vertices of the primitive; and when it is determined based on the measure of the size of a primitive to perform processing of one or more attributes of the vertices of the primitive, storing the one or more processed position attributes for the vertices of the primitive for use in subsequent processing.

8. The method of claim 1, comprising providing in association with a primitive list that a primitive is included in, an indication indicating whether it was determined based on a measure of the size of the primitive to perform processing of one or more attributes of the vertices of the primitive.

9. The method of claim 1, comprising when performing subsequent processing of primitives of the set of primitives:

identifying a primitive list relevant to a tile to be processed;

identifying a primitive to be processed from the primitive list;

checking an indication for the identified primitive to determine whether processing of one or more attributes of the vertices of the primitive has already been performed; and when the indication indicates that processing of one or more attributes of the vertices of the primitive has already been performed:

reading the one or more processed attributes for the vertices of the primitive from memory, and performing subsequent processing of the primitive for the tile using the one or more processed attributes read from memory;

when the indication indicates that processing of one or more attributes of the vertices of the primitive has not already been performed when preparing the primitive list:

performing processing of one or more attributes of the vertices of the primitive prior to performing subsequent processing of the primitive for the tile using the one or more processed attributes of the vertices of the primitive.

10. A graphics processor configured to generate a render output using tile based rendering, in which a plurality of tiles of a render output being generated are rendered separately, and the rendered tiles are combined to form the render output, the graphics processor comprising:

a primitive list preparation circuit configured to prepare one or more primitive lists for a render output, each primitive list of the one or more primitive lists for the render output listing primitives of a set of primitives to be processed for the render output to be processed for a respective region of the render output, each primitive having associated with it one or more vertices;

wherein the primitive list preparation circuit comprises a determination circuit configured to, for a primitive of the set of primitives to be processed for the render output to be included in a primitive list or lists of the one or more primitive lists for the render output, determine based on a measure of the size of the primitive whether to perform processing of one or more attributes of one or more of the vertices of the primitive;

wherein the primitive list preparation circuit is configured to:

when it is determined based on the measure of the size of a primitive to perform said processing of one or more attributes of one or more vertices of the primitive, trigger said processing of one or more attributes of one or more vertices of the primitive and storing of the processed attribute or attributes for use in subsequent processing of the primitive, and include the primitive in said a primitive list or lists for the render output;

when it is determined based on the measure of the size of a primitive to not perform said processing of one or more attributes for one or more vertices of the primitive, include the primitive in said primitive list or lists for the render output without also triggering said processing of one or more attributes for one or more vertices of the primitive in response to the primitive size determination.

11. The graphics processor of claim 10, wherein:

the determination circuit is configured to, when the measure of the size of a primitive is larger than a threshold measure of size, determine to perform the processing of the one or more attributes of one or more of the vertices of the primitive; and the determination circuit is configured to, when the measure of the size of a primitive is smaller than a threshold measure of size, determine not to perform the processing of the one or more attributes of one or more of the vertices of the primitive.

12. The graphics processor of claim 10, wherein the measure of size of the primitive is a measure of a number of tiles of the render output that the primitive spans.

13. The graphics processor of claim 10, wherein the measure of the size of the primitive is determined based on the number of primitive lists in which a primitive is to be listed and/or based on the size of the regions for those primitive lists.

14. The graphics processor of claim 10, wherein the graphics processor is configured to selectively disable the determination by the determination circuit based on the measure of size of the primitive.

15. The graphics processor of claim 10, wherein the processing of one or more attributes which is triggered by the primitive list preparation circuit based on a measure of the size of a primitive comprises processing of one or more non-position attributes.

16. The graphics processor of claim 10, wherein the graphics processor is configured to:
process one or more position attributes for the vertices of the primitives in the set of primitives, to provide processed position attributes for use when preparing the one or more primitive lists; and
when it is determined based on the measure of the size of a primitive not to perform processing of one or more non-position attributes, discard processed position attributes for the vertices of the primitive without storing the processed position attributes for use in subsequent processing; and
when it is determined based on the measure of the size of a primitive to perform processing of one or more non-position attributes of the vertices of the primitive, store processed position attributes for the vertices of the primitive for use in subsequent processing.

17. The graphics processor of claim 10, wherein the primitive list preparation circuit is configured to provide in association with a primitive list that a primitive is included in, an indication of whether it was determined based on a measure of the size of a primitive to perform processing of one or more attributes of the vertices of the primitive.

18. The graphics processor of claim 10, wherein the graphics processor comprises a primitive list reading circuit which is configured to:
read a primitive list relevant to a tile to be processed;
identify a primitive to be processed from the primitive list;
check an indication for the primitive to determine whether processing of one or more attributes of the vertices of the primitive has already been performed; and
when the indication indicates that processing of one or more attributes of the vertices of the primitive has already been performed:
trigger subsequent processing of the primitive for the tile;
when the indication indicates that processing of one or more attributes of the vertices of the primitive has not already been performed:
trigger processing of one or more attributes of the vertices of the primitive prior to processing of the primitive for the tile.

19. A graphics processor configured to generate a render output using tile based rendering, in which a plurality of tiles of a render output being generated are rendered separately, and the rendered tiles are combined to form the render output, the graphics processor comprising:
a primitive list reading circuit configured to:
read a primitive list relevant to a tile to be processed, the primitive list listing one or more primitives for the tile to be processed, the primitive list also comprising a respective indication for each primitive of the one or more primitives listed in the primitive list indicating whether processing of one or more attributes of one or more vertices of the primitive has been performed;
identify a primitive to be processed from the one or more primitives listed in the primitive list for the tile to be processed;
check for the identified primitive the respective indication in the primitive list for the tile to be processed to determine whether said processing of one or more attributes of one or more vertices of the primitive has already been performed; and
when the indication checked in the primitive list for the tile to be processed indicates that said processing of one or more attributes of one or more vertices of the primitive has already been performed:
trigger processing of the primitive for the tile;
when the indication checked in the primitive list for the tile to be processed indicates that said processing of one or more attributes of one or more vertices of the primitive has not already been performed:
trigger said processing of one or more attributes for one or more vertices of the primitive prior to processing of the primitive for the tile.

20. A non-transitory computer readable storage medium comprising computer software code which when executing on at least one processor performs a method of operating a graphics processor when generating a render output using tile based rendering, in which a plurality of tiles of a render output being generated are rendered separately, and the rendered tiles are combined to form the render output, the method comprising:
preparing one or more primitive lists for the render output, each primitive list of the one or more primitive lists for the render output listing primitives of a set of primitives to be processed for the render output to be processed for a respective region of the render output, each primitive having associated with it one or more vertices; and
for a primitive of the set of primitives to be processed for the render output to be included in a primitive list or lists of the one or more primitive lists for the render output:
determining, based on a measure of the size of the primitive, whether to perform processing of one or more attributes of one or more of the vertices of the primitive; and
when it is determined based on the measure of the size of the primitive to perform said processing of one or more attributes of one or more vertices of the primitive, performing said processing of one or more attributes of one or more vertices of the primitive and storing the processed attribute or attributes for use in subsequent processing of the primitive, as well as including the primitive in said primitive list or lists;
when it is determined based on the measure of the size of the primitive to not perform said processing of one or more attributes for one or more vertices of the primitive, including the primitive in said primitive list or lists without also performing said processing of one or more attributes for one or more vertices of the primitive in response to the primitive size determination.

* * * * *